United States Patent
Masuda et al.

[11] Patent Number: 6,069,244
[45] Date of Patent: May 30, 2000

[54] PHTHALOCYANINE COMPOUND, METHOD FOR PRODUCTION THEREOF, AND USE THEREOF

[75] Inventors: Kiyoshi Masuda; Osamu Kaieda, both of Ibaraki, Japan

[73] Assignee: Nippon Shokubai Co., Ltd., Osaka, Japan

[21] Appl. No.: 09/243,707

[22] Filed: Feb. 3, 1999

[30] Foreign Application Priority Data

Feb. 3, 1998 [JP] Japan .................................. 10-022318

[51] Int. Cl.[7] .......................... C09B 47/10; C07D 487/22; F21V 9/04
[52] U.S. Cl. .......................... 540/139; 540/137; 540/140; 252/587; 524/88
[58] Field of Search ........................ 252/587; 540/137, 540/139, 140; 524/88

[56] References Cited

U.S. PATENT DOCUMENTS

| | | | |
|---|---|---|---|
| 3,575,871 | 4/1971 | Susi et al. | 252/300 |
| 3,709,830 | 1/1973 | Susi | 252/300 |
| 4,296,214 | 10/1981 | Kamada et al. | 525/2 |
| 4,755,012 | 7/1988 | Kojima | 350/1.1 |
| 4,763,966 | 8/1988 | Suzuki et al. | 350/1.1 |
| 5,359,056 | 10/1994 | Oi et al. | 524/88 |
| 5,516,899 | 5/1996 | Campbell et al. | 540/123 |
| 5,712,332 | 1/1998 | Kaieda et al. | 524/88 |
| 5,804,102 | 9/1998 | Oi et al. | 252/587 |

FOREIGN PATENT DOCUMENTS

| | | | |
|---|---|---|---|
| 51-135886 | 11/1976 | Japan . | |
| 1-161036 | 6/1989 | Japan . | |
| 3-161644 | 7/1991 | Japan . | |
| 3-227366 | 10/1991 | Japan . | |
| 06025548 | 2/1994 | Japan | C09B 47/22 |

*Primary Examiner*—Mukund J. Shah
*Assistant Examiner*—Pavanaram K Sripada
*Attorney, Agent, or Firm*—Fish & Richardson P.C.

[57] ABSTRACT

A phthalocyanine compound possessing an excellent ability to absorb near infrared ray, exhibiting excellent compatibility with resin, and excelling in such special qualities as heat resistance, light resistance, and resistance to weather conditions is provided. This phthalocyanine compound is represented by the following general formula (1)

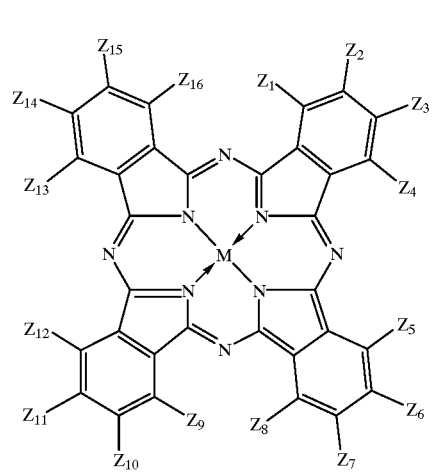

(1)

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them is for $SR^1$ or $OR^2$, $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a fluorine atom and at least one of them is $NHR^3$, at least one of $Z_1$ to $Z_{16}$ is a fluorine atom or $OR^2$, $R^1$, $R^2$, and $R^3$ are independently a substituted or non-substituted phenyl group, a substituted or non-substituted aralkyl group, or a substituted or non-substituted alkyl group of 1 to 20 carbon atoms, and M is for a nonmetal, a metal, a metal oxide, or a metal halide.

19 Claims, 1 Drawing Sheet

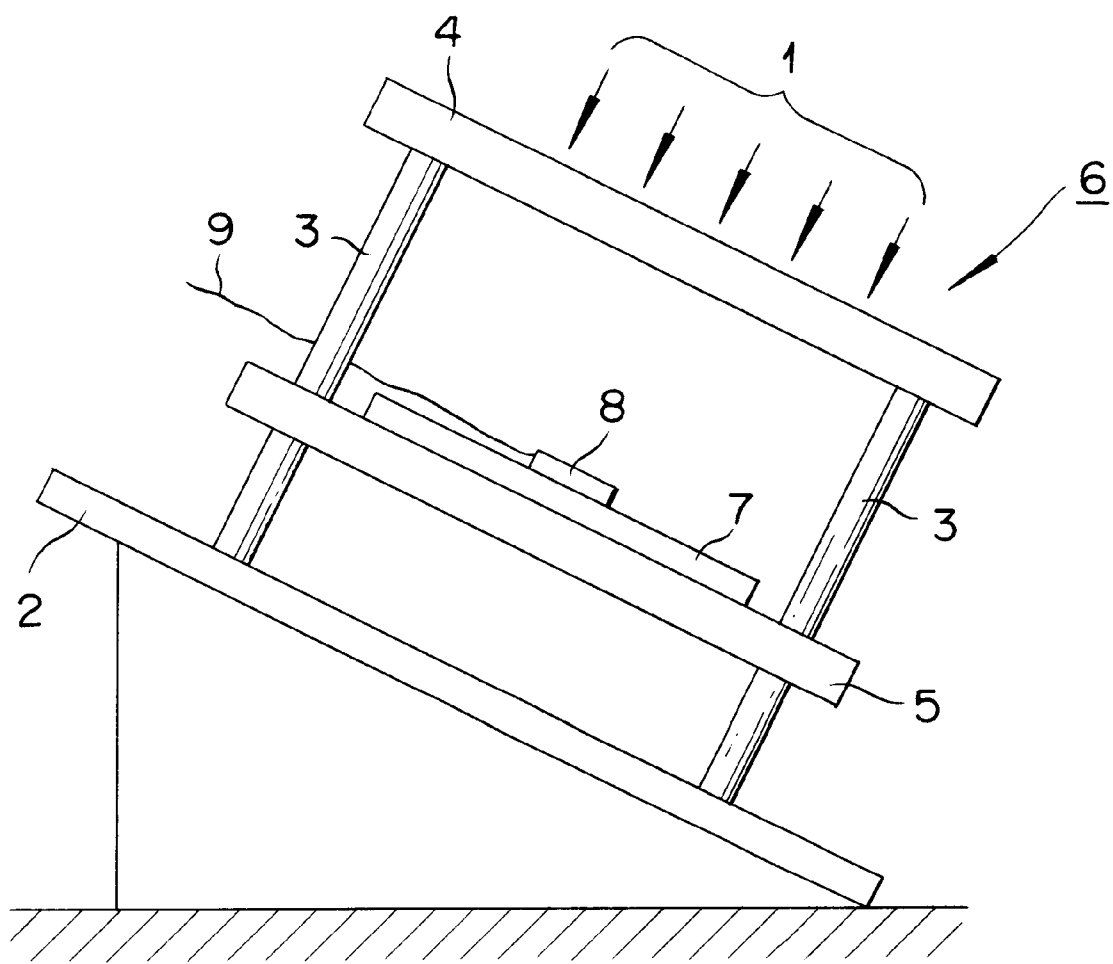
FIGURE

PHTHALOCYANINE COMPOUND, METHOD FOR PRODUCTION THEREOF, AND USE THEREOF

BACKGROUND OF THE INVENTION

1. Field of the Invention

This invention relates to a novel phthalocyanine compound, a method for the production thereof, and uses found therefor. More particularly, it relates to a phthalocyanine compound which exhibits high transmittance, particularly to a visible light ray, enjoys a high efficiency in cutting the near infrared ray, excels in the ability to absorb the near infrared ray, manifests fine compatibility with resin, and excels in such special qualities as heat resistance, light resistance, and resistance to weather and a near infrared absorbable dye. This invention further relates to a method for producing the phthalocyanine compound with high efficiency at a high purity.

Further, this invention relates to a heat wave shielding material containing the phthalocyanine compound or the near infrared absorbable dye, i.e. one of the use inventions for the phthalocyanine compound or the near infrared absorbable dye mentioned above, and more particularly relates to such heat wave shielding materials as windows in buildings or vehicles, light windows, automobile garages, ceiling domes, horticultural hothouses, sunglasses, and goggles which possess opacity or transparency and serve the purpose of shielding heat wave.

Further, this invention relates to a plasma display grade filter formed by incorporating therein the phthalocyanine compound or the near infrared absorbable dye mentioned above, i.e. another of the use inventions for the phthalocyanine compound or the near infrared absorbable dye mentioned above, and more particularly relates to a plasma display grade filter which serves the purpose of cutting the near infrared ray (750 to 1,100 nm) emanating from a display and preventing the peripheral electronic devices from producing a malfunction. More particularly, this invention relates to a plasma display grade filter containing the phthalocyanine compound or near infrared absorbing dye mentioned above as a near infrared absorbent, exhibiting high transmittance to the visible ray and allowing a highly efficient cut of the near infrared ray.

The phthalocyanine compound or the near infrared absorbable dye of this invention manifests an excellent effect when it is used as a near infrared absorbent for the non-contact fixing toner as in the flash fixing or as a near infrared absorbent for the insulating heat accumulating fibers.

The phthalocyanine compound or the near infrared absorbable dye of this invention manifests an excellent effect when it is used as a near infrared absorbable dye or a near infrared sensitizer for writing or reading data in an optical recording medium operating with a semiconductor laser, a liquid crystal display device, or an optical character reader, as a photothermal converting agent in a thermosensitive transfer-thermosensitive perforated plate, a near infrared absorbable filter, an eye strain preventing agent, or a photoconductive material, and as an oncotherapy grade photosensitive dye acquiring highly satisfactory permeation through tissues and absorbing light in a long wavelength range, as a color braun tube grade selective absorbing filter, as a color toner, as an ink jet grade ink, as an indelible bar code ink, and as a near infrared absorbing ink.

2. Description of the Related Art

In recent years, heat wave shielding materials which are adapted to absorb near infrared ray have been encouraging introduction of varying uses and the desirability of developing such heat wave shielding materials with improved performance has been finding enthusiastic recognition. The following uses may be cited as typical examples.

Since such materials as methacrylic resin and polycarbonate resin possess outstanding transparency and weatherability, they have been heretofore found utility in the so-called glazing applications such as windows in buildings and vehicles, ceiling windows, doors, and ceiling domes. Since they also exhibit high transmittance to the heat wave in the sunlight, they are at a disadvantage in inducing a copious rise of internal temperature as when they are directly exposed to the sunlight. To overcome this defect, these materials are urged to be so adapted as to prevent their interior temperature from rising and, at the same time, permit fully satisfactory admission of the visible light.

At present, in the cultivation of plants, hothouses and PVC film houses are extensively utilized for the purpose of improving the harvests of crops in quality or changing the time of harvest. One of the tasks that are imposed thereon comprises preventing their interior temperature from rising particularly in the summer season. It is well known that the light in the near infrared region affects the control of the growth of plants. The addition of an absorbent for the light in the near infrared region is aimed at this control. For this reason, the desirability of developing a heat ray shielding film which manifests an expected effect without substantially impeding passage of the visible light which is indispensable to the growth of plants has been finding recognition.

At present, the near infrared is frequently utilized in starting or stopping such electrical products as magnetic tapes. Though the near infrared serving this purpose requires to be shielded from an external near infrared, the demand for utilizing this near infrared for such applications is persisting.

The infrared ray contained in the sunlight or the infrared ray contained in the ray of light radiated from the terminal display of a computer or emitted during the work of welding is harmful to the human eyes. Thus, the demand for sunglasses, ordinary spectacles, contact lenses, and goggles which are effective in shielding the heat ray for the purpose of protecting the human eyes is also persisting.

In the circumstances, therefore, several heat ray shielding materials have been proposed to date. The resins which are used in these heat ray shielding materials include such transparent materials as polycarbonate resin, acrylic resin, and vinyl chloride resin, which are properly selected to suit the purpose of application. As typical examples of the additive for shielding the heat ray, numerous dyes and dyes which are capable of absorbing light in the near infrared region have been known. The heat ray shielding materials using such dyes and dyes have been also proposed. They, however, are deficient in transparent because they invariably exhibit strong absorption in the visible region.

For the purpose of solving these problems, U.S. Pat. No. 4,296,214, for example, has proposed a method which comprises adding a dye exhibiting only small absorption in the visible region. This method, however, has the problem of inevitably requiring the dye to be added in a large amount enough to manifest the effect of shielding the heat ray because of the poor ability to absorb the near infrared ray and consequently inducing degradation of the transmittance to the visible ray and impairing the transparency.

JP-A-51-135,886, U.S. Pat. No. 4,763,966, U.S. Pat. No. 4,755,012, etc. have proposed methods which reside in adding a dye exhibiting absorption in the near infrared region. The dye, however, has the problem of finding only limited use because it is deficient in solubility, exhibiting inferior compatibility with resin, and allowing fully satisfactory uniformity.

For example, a composition incorporating an inorganic dye therein has proposed. Though this composition indeed manifests a satisfactory effect in shielding the heat ray, it fits only limited use because it is low passing ratio of the visible ray and leanes haze. Further, JP-A-01-161,036, JP-A-03-227,366, etc. have proposed methods which comprises incorporating such additives as tungsten hexachloride. Though these methods bring a fully satisfactory effect in shielding the heat ray, they are at a disadvantage in suffering from poor light stability and have the problem of imposing a limit on the field of utility because of the high price of additive to be used.

The idea of using an infrared absorbent which is formed of an organic dye has been conceived as disclosed in JP-B-43-25,335, for example. The heat ray shielding material using this infrared absorbent imparts the sensation of transparency and excels in workability. As stated in JP-B-43-25,335, however, organic infrared absorbents generally succumb to decomposition at a temperature exceeding 200° C. and, therefore, suffer from such restrictions on handling as substantially finding only limited utility in the cast polymerization.

For the purpose of preventing such an infrared absorbent from the problem of heat resistance, the idea of manufacturing a laminate by a method which comprises forming a film of a composition resulting from adding an infrared absorbent of a low heat-resisting temperature to a transparent resin of a low forming temperature and thermally superposing the film on a transparent resin sheet of a high forming temperature has been conceived as disclosed in JP-A-03-161,644, for example. This method, however, has not constituted itself a substantial liberation of the infrared absorbent from the problem of heat resistance. Further, the film containing this infrared absorbent is fairly expensive because it by nature needs to be formed by cast polymerization.

Among the inventions perfected and proposed by the present inventors with a view to solving the problems mentioned above are counted the phthalocyanine compound-containing heat ray shielding materials which, as disclosed in U.S. Pat. No. 5,435,462, JP-A-06-25,548, and U.S. Pat. No. 5,359,056, excel in the ability to absorb near infrared ray, excel in the compatibility with resin, and exhibit highly satisfactory resistance to heat and light. The phthalocyanine compound-containing heat ray shielding materials mentioned above allow relatively satisfactory passage of the visible ray, exhibit an excellent effect in shielding the heat ray, and fit utility as resin plates, sheets, or films in such objects as windows in buildings and vehicles, ceiling windows, doors, automobile garages, ceiling domes, horticultural hothouses, sunglasses, and goggles which possess opacity or transparency and serve the purpose of shielding the heat ray. (The present inventors, as specifically described herein below, have pursued a deliberate study further on the inventions disclosed in U.S. Pat. No. 5,435,462, JP-A-06-25,548, and U.S. Pat. No. 5,359,056 to discover that among the compounds neither specifically cited in the specification nor demonstrated by means of a working example are included such phthalocyanine compounds as manifest the conspicuous effect of allowing excellent transmittance to the visible ray as compared with the effect disclosed in U.S. Pat. No. 5,435,462, JP-A-06-25,548, and U.S. Pat. No. 5,359, 056. They have continued a diligent study further on the outcomes of the study to find that, even in the other technical field (application), the phthalocyanine compounds manifest the conspicuous effect of allowing exaltation of the transparency.)

In other technical field than those mentioned above, U.S. Pat. No. 5,516,899 discloses a phthalocyanine compound which has either of SR and NHR (R denoting such an organic group as substituted or unsubstituted alkyl group or aryl group) attached as a substituent respectively at 15 of the total of 16 positions of a phthalocyanine nucleus available for substitution. According to the specification, this compound is purportedly useful for the purpose of absorbing the electromagnetic wave emitted from a laser source and usable for the purpose of coating an optical data memory disk. This compound, like the compounds disclosed in U.S. Pat. No. 5,435,462, JP-A-06-25,548, and U.S. Pat. No. 5,359,056 mentioned above, does not deserve to be called satisfactory in terms of the transmittance to the visible ray.

Further, the prospect of the plasma display finding utility in large thin-wall television sets or as thin-wall displays has come to attract attention in recent years. The large thin-wall television sets and the thin-wall displays which actually use the plasma display have already making a market debut. The near infrared ray emanating from the plasma display, however, has been causing the problem of compelling such peripheral electronic devices as cordless phones and video decks using a near infrared remote control to produce an erroneous operation. While it has been known to manufacture a near infrared absorbing filter by the use of a near infrared absorbable dye, a typical measure for preventing the display from inducing the erroneous operation has not been fully developed. Barely, JP-A-09-230,134 has proposed a method for solving the problem in question by the use of a plasma display grade filter containing a metal complex compound. The metal complex compound, however, has the problem of inferior compatibility with resin because it possesses such low solubility that it will hardly melt in a given resin even after they are kneaded together at such a high temperature as 260° C. or 280° C. for a long time. It further does not manifest a fully satisfactory effect in absorbing the near infrared ray because the amount thereof to be added and the kind of resin to be mixed therewith have their own limits. While the desirability of developing a plasma display grade filter capable of manifesting a perfect effect in absorbing the near infrared ray has been finding recognition, no proposal has yet been advanced regarding a method for coping with the problem under discussion by the use of a plasma display grade filter containing such a phthalocyanine compound as effectively forms a near infrared absorbent.

This invention has been initiated in the light of the true state of the prior art in the various fields (applications) which allow utility of phthalocyanine compounds.

Specifically, this invention has been produced for the purpose of solving the technical problems to be encountered in the various fields (applications) which allow utility of phthalocyanine compounds. An object of this invention is to provide a phthalocyanine compound and a near infrared absorbable dye which exhibit particularly high transmittance to the visible ray, offer a highly efficient cut of the near infrared ray, excel in the ability to effect selective absorption in the near infrared region, excel in the compatibility with resin, and excel in the resistance to heat, light, and weather conditions.

A further object of this invention is to provide a phthalocyanine compound and a near infrared absorbable dye which are capable of controlling the absorption wavelength fitting the purpose of use in the near infrared region (an absorption wavelength region of 750 to 1,100 nm) and exhibiting excellent solubility in such solvents as, for example, hydrophilic solvents, alcoholic solvents, oleophilic solvents, ketones, and aromatic hydrocarbon solvents.

Another object of this invention is to provide a method for producing the phthalocyanine compound mentioned above with high efficiency at a high impurity.

Still another object of this invention is to provide an inexpensive heat ray shielding material which allows selective absorption of light in the near infrared region and performs an effective cut of the heat from the sunlight while keeping the transmittance in the visible region at a relatively high level. To be specific, this invention intends to provide a heat ray shielding material capable of manifesting an outstanding shielding effect by developing a transparent resin containing a novel phthalocyanine compound excelling in the ability to effect selective absorption of light in the near infrared region, excelling in the compatibility with resin, and offering excellent resistance to heat, light, and weather conditions.

Still another object of this invention is to provide a heat ray shielding material which is usable in a wide variety of applications by using invariably inexpensive organic materials for the components of a heat ray shielding material. It further resides in ensuring impartation to the phthalocyanine compound of excellent resistance to heat thereby allowing provision of a heat ray shielding material which can be manufactured from a standard thermoplastic resin by the use of such a method of molding of excellent productivity as the injection molding or the extrusion molding, for example.

Still another object of this invention is to provide a practical plasma display grade filter which allows an effective cut of light in the near infrared region, i.e. 750 to 1,100 nm, preferably 800 to 1,000 nm, liable to induce peripheral electronic devices to produce an erroneous operation due to the light escaping from the display and, at the same time, exhibits a high transmittance to the visible ray without sacrificing the clarity of display.

SUMMARY OF THE INVENTION

The present inventors have made a diligent study with a view to solving the technical problems encountered by the prior art in the various fields of utility (applications) allowed for phthalocyanine compounds. They have perfected this invention as a result.

Specifically, the objects of the present invention can be accomplished as indicated in the following items (1) to (8).

(1) A phthalocyanine compound represented by the following general formula (1)

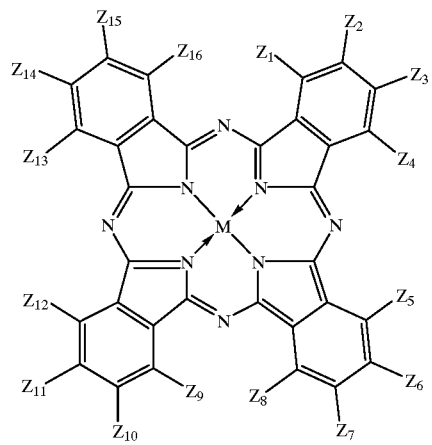

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them is $SR^1$ or $OR^2$, $Z_1$, $Z_4$, $Z_5$, $Z_8$, $Z_9$, $Z_{12}$, $Z_{13}$, and $Z_{16}$ are independently $NHR^3$, $SR^1$, $OR^2$, or a fluorine atom and at least one of them is $NHR^3$, at least one of $Z_1$ to $Z_{16}$ is a fluorine atom or $OR^2$, $R^1$, $R^2$, and $R^3$ are independently a substituted or non-substituted phenyl group, a substituted or non-substituted aralkyl group, or a substituted or non-substituted alkyl group of 1 to 20 carbon atoms, and M is a nonmetal, a metal, a metal oxide, or a metal halide.

(2) A phthalocyanine compound according to (1) above, wherein 4 to 8 of $Z_2$, $Z_3$, $Z_6$, $Z_7$, $Z_{10}$, $Z_{11}$, $Z_{14}$, and $Z_{15}$ are invariably $SR^1$ or $OR^2$.

(3) A near infrared absorbable dye formed by using a phthalocyanine compound set forth in (1) or (2) above, which dye exhibits a transmittance of not less than 65% to the visible ray in a solution prepared to contain the phthalocyanine compound at a concentration such that a minimum value of the transmittance at 750 to 1,100 nm becomes in the range of 5 to 6% in the measurement of a transmission spectrum.

(4) A method for the production of a phthalocyanine compound represented by the general formula (3):

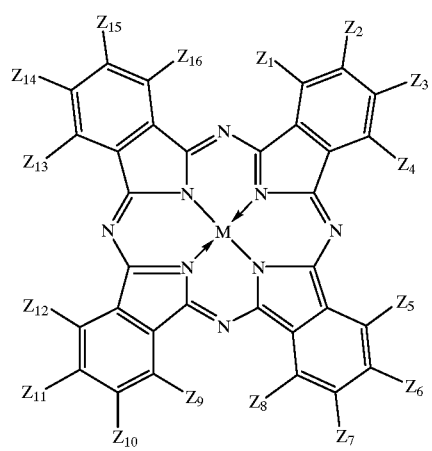

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them are $SR^1$ or $OR^2$, $Z_1$, $Z_4$, $Z_5$, $Z_8$, $Z_9$, $Z_{12}$, $Z_{13}$, and $Z_{16}$ are independently $NHR^3$, $SR^1$, $OR^2$, or a fluorine atom and at least one of them stands for $NHR^3$, $R^1$, $R^2$, and $R^3$ are independently a substituted or non-substituted phenyl group, a substituted or non-substituted aralkyl group, or a substituted or non-substituted alkyl group of 1 to 20 carbon atoms, and M is a nonmetal, a metal, a metal oxide, or a metal halide, which comprises reacting a phthalocyanine compound represented by the following general formula (2):

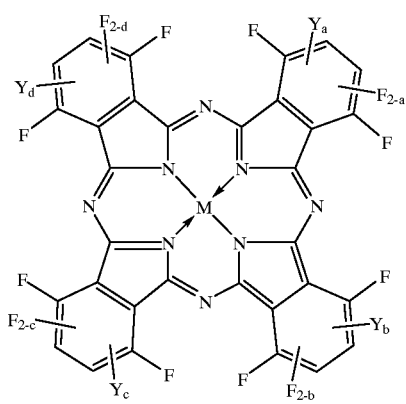

(2)

wherein Y is $SR^1$ or $OR^2$, $R^1$ and $R^2$ are independently a substituted or non-substituted phenyl group, a substituted or non-substituted aralkyl group, or a substituted or non-substituted alkyl group of 1 to 20 carbon atoms, the symbols a to d are independently an integer of 0 to 2 and the total of 1 to 8 is an integer of 1 to 8, and M is a nonmetal, a metal, a metal oxide, or a metal halogenide, with an amino compound represented by the formula, $NH_2R^3$, wherein $R^3$ is a substituted or non-substituted phenyl group, a substituted or non-substituted aralkyl group, or a substituted or non-substituted alkyl group of 1 to 20 carbon atoms.

(4) A heat ray shielding material formed of a resin containing 0.0005 to 20 parts by weight, based on 100 parts by weight of the resin, of either of the phthalocyanine compound and the near infrared absorbable dye set forth in (1) to (3) above.

(5). A heat ray shielding material formed of a resin containing 0.0005 to 20 parts by weight, based on 100 parts by weight of said resin, of said phthalocyanine compound or said near infrared absorbable dye set forth in (1) to (3) above or the above-mentioned general formula (3).

(6) A heat ray shielding material set forth in (5) above, wherein the resin is a transparent resin.

(7) A heat ray shielding material set forth in (5) or (6) above, wherein the transparent resin is at least one member selected from the group consisting of polycarbonate resin, poly(meth)acrylic resin, polyethylene resin, polyester resin, polystyrene resin, and vinyl chloride resin.

(8) A plasma display grade filter containing either of the phthalocyanine compound and the near infrared absorbable dye set forth in (1) to (3) above or the above-mentioned general formula (3).

BRIEF DESCRIPTION OF THE DRAWING

FIG. 1 is a schematic diagram illustrating a temperature measuring device so constructed that the panel used for the measurement in Examples 24 and 25 and Controls 5 to 7 suffers no accumulation of heat therein because it permits passage of a current of air therethrough.

DESCRIPTION OF THE PREFERRED EMBODIMENT

The phthalocyanine compound of this invention is represented by the following general formula (1)

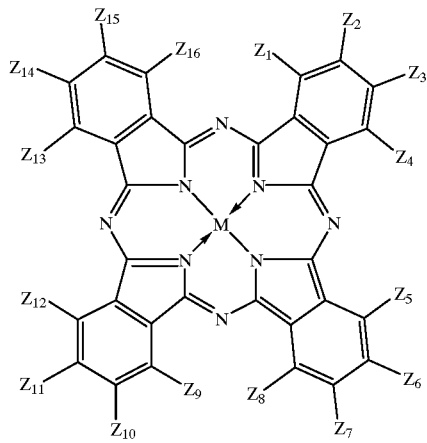

(1)

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them are $SR^1$ or $OR^2$, $Z_1$, $Z_4$, $Z_5$, $Z_8$, $Z_9$, $Z_{12}$, $Z_{13}$, and $Z_{16}$ are independently $NHR^3$, $SR^1$, $OR^2$, or a fluorine atom and at least one of them stands for $NHR^3$, at least one of $Z_1$ to $Z_{16}$ is a fluorine atom or $OR^2$, $R^1$, $R^2$, and $R^3$ are independently a substituted or non-substituted phenyl group, a substituted or non-substituted aralkyl group, or a substituted or non-substituted alkyl group of 1 to 20 carbon atoms, and M is a nonmetal, a metal, a metal oxide, or a metal halide, and a phthalocyanine compound represented by the general formula (3):

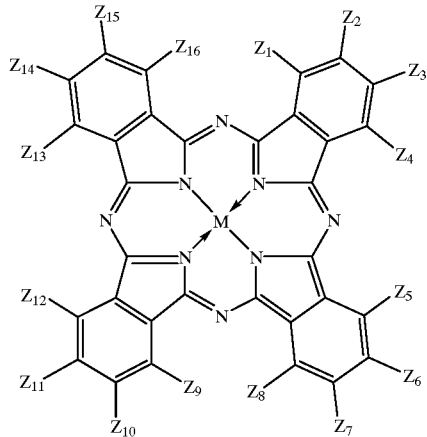

(3)

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them are $SR^1$ or $OR^2$, $Z_1$, $Z_4$, $Z_5$, $Z_8$, $Z_9$, $Z_{12}$, $Z_{13}$, and $Z_{16}$ are independently $NHR^3$, $SR^1$, $OR^2$, or a fluorine atom and at least one of them stands for $NHR^3$, $R^1$, $R^2$, and $R^3$ are independently a substituted or non-substituted phenyl group, a substituted or non-substituted aralkyl group, or a substituted or non-substituted alkyl group of 1 to 20 carbon atoms, and M is a nonmetal, a metal, a metal oxide, or a metal halide.

In the general formulas (1) and (3) shown above, $R^1$, $R^2$, and $R^3$ are independently a substituted or non-substituted phenyl group, a substituted or non-substituted aralkyl group, or a substituted or non-substituted alkyl group of 1 to 20 carbon atoms.

As typical examples of the substituent optionally present in the phenyl group or the aralkyl group mentioned above, halogen atoms, acyl groups, alkyl groups, alkoxy groups, halogenated alkyl groups, halogenated alkoxy groups, nitro group, amino group, alkyl amino groups, alkylcarbonyl amino groups, aryl amino groups, aryl carbonyl amino groups, carbonyl group, alkoxycarbonyl groups, may be cited, though not exclusively. These substituents are allowed to occur either singly or collectively in a group of up to five members on the phenyl group or the aralkyl group (specifically in the benzene nucleus thereof). When the substitution occurs with a plurality of groups, the substituents to be involved may be identical or not identical in kind with each other. For example, a phenyl group or an aralkyl group substituted by 1 to 3 alkyl groups of 1 to 4 carbon atoms, a phenyl group or an aralkyl group substituted by 1 or 2 alkoxy groups of 1 to 4 carbon atoms, and a phenyl group or an aralkyl group substituted by 1 to 5 halogen atoms such as, for example, chlorine atoms or fluorine atoms may be cited. Part of the substituents enumerated above will be described more specifically below by reference to typical examples.

For a start, in the substituents optionally present in the phenyl group or the aralkyl group mentioned above, the halogen atoms include fluorine atoms, chlorine atoms, bromine atoms, and iodine atoms. Among other halogen atoms mentioned above, fluorine atoms prove particularly preferable.

Then, in the substituents optionally present in the phenyl group or the aralkyl group mentioned above, the acyl groups include acetyl group, ethyl carbonyl group, propyl carbonyl group, butyl carbonyl group, pentyl carbonyl group, hexyl carbonyl group, benzoyl group, and p-t-butyl benzoyl group, for example.

In the substituents optionally present in the phenyl group or the aralkyl group mentioned above, the alkyl groups include linear, branched, and cyclic alkyl groups of 1 to 20 carbon atoms. Among other alkyl groups mentioned above, alkyl groups of 1 to 8 carbon atoms prove particularly preferable. As typical examples of the alkyl groups, methyl group, ethyl group, n-propyl group, isopropyl group, n-butyl group, isobutyl group, sec-butyl group, tert-butyl group, n-pentyl group, isopentyl group, neopentyl group, 1,2-dimethylpropyl group, n-hexyl group, cyclohexyl group, 1,3-dimethylbutyl group, 1-isopropylpropyl group, 1,2-dimethylbutyl group, n-heptyl group, 1,4-dimethylpentyl group, 2-methyl-1-isopropylpropyl group, 1-ethyl-3-methylbutyl group, n-octyl group, and 2-ethylhexyl group may be cited as well.

In the substituents optionally present in the phenyl group or the aralkyl group mentioned above, the alkoxy groups include linear, branched, or cyclic alkoxy groups of 1 to 20 carbon atoms, preferably alkoxy groups of 1 to 8 carbon atoms. As typical examples of the alkoxy groups, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, 1,2-dimethylpropoxy group, n-hexyloxy group, cyclohexyloxy group, 1,3-dimethylbutoxy group, and 1-isopropylpropoxy group may be cited as well.

In the substituents optionally present in the phenyl group or the aralkyl group mentioned above, the halogenated alkyl groups are partially halogenated linear, branched, or cyclic alkyl groups of 1 to 20 carbon atoms, preferably partially halogenated alkyl groups of 1 to 8 carbon atoms. More specifically, they are monohalogenated alkyl groups such as chloromethyl group, bromomethyl group, trifluoromethyl group, chloroethyl group, 2,2,2-trichloroethyl group, bromoethyl group, chloropropyl group, and bromopropyl group, for example.

In the substituents optionally present in the phenyl group or the aralkyl group mentioned above, the halogenated alkoxy groups are partially halogenated linear, branched, or cyclic alkoxy groups of 1 to 20 carbon atoms, preferably partially halogenated alkoxy groups of 1 to 8 carbon atoms. More specifically, they are monohalogenated alkoxy groups such as chloromethoxy group, bromomethoxy group, trifluoromethoxy group, chloroethoxy group, 2,2,2-trichloroethoxy group, bromoethoxy group, chloropropoxy group, and bromopropoxy group, for example.

In the substituents optionally present in the phenyl group or the aralkyl group mentioned above, the alkylamino groups are alkylamino groups containing an alkyl moiety of 1 to 20 carbon atoms, preferably alkylamino groups containing an alkyl moiety of 1 to 8 carbon atoms. More specifically, they are methylamino group, ethylamino group, n-propylamino group, n-butylamino group, sec-butylamino group, n-pentylamino group, n-hexylamino group, n-heptylamino group, n-octylamino group, 2-ethylhexylamino group, for example.

In the substituents optionally present in the phenyl group or the aralkyl group mentioned above are typically methoxycarbonyl group, ethoxycarbonyl group, n-propoxycarbonyl group, isopropoxycarbonyl group, n-butoxycarbonyl group, isobutoxycarbonyl group, sec-butoxycarbonyl group, and tert-butoxycarbonyl group, for example.

The unsubstituted alkyl groups of 1 to 20 carbon atoms may be any of linear, branched, or cyclic alkyl groups of 1 to 20 carbon atoms, preferably alkyl groups of 1 to 8 carbon atoms. More specifically, they are methyl group, ethyl group, n-propyl group, isopropyl group, n-butyl group, isobutyl group, sec-butyl group, tert-butyl group, n-pentyl group, isopentyl group, neopentyl group, 1,2-dimethylpropyl group, n-hexyl group, cyclohexyl group, 1,3-dimethylbutyl group, isopropylpropyl group, 1,2-dimethylbutyl group, n-heptyl group, 1,4-dimethylpentyl group, 2-methyl-1-isopropylpropyl group, 1-ethyl-2-methylbutyl group, n-octyl group, and 2-ethylhexyl group, for example.

The substituents optionally present in the alkyl groups of 1 to 20 carbon atoms mentioned above include halogen atoms, alkoxy groups, hydroxyalkoxy groups, alkoxyalkoxy groups, and halogenated alkoxy groups, for example. The typical examples of these substituents are equal to the substituents which are optionally present in the phenyl group or the benzyl group mentioned above.

Then, in the general formulas (1) and (3) mentioned above, M is a nonmetal, a metal, a metal oxide, or a metal halide. The term "nonmetal" as used herein means atoms other than metal atoms such as, for example, two hydrogen atoms. As typical examples of the metal, iron, magnesium, nickel, cobalt, copper, palladium, zinc, vanadium, titanium, indium, and tin may be cited. As typical examples of the metal oxide, titanyl and vanadyl may be cited. As typical examples of the metal halide, aluminum chloride, indium chloride, germanium chloride, tin chloride, and silicon chloride may be cited. M is preferably metals, metal oxides, or metal halide. More specifically, copper, zinc, cobalt, nickel, iron, vanadyl, titanyl, chloroindium, and dichlorotin are preferably used, copper, zinc, cobalt, vanadyl, and dichlorotin are particularly preferably used, and zinc, cobalt, vanadyl, and dichlorotin are more preferably used.

In the phthalocyanine compound of the general formulas (1) and (3) mentioned above, $Z_2$, $Z_3$, $Z_6$, $Z_7$, $Z_{10}$, $Z_{11}$, $Z_{14}$, and $Z_{15}$ (which may be occasionally referred to, in this specification, as substituents for attachment respectively at eight β positions in a phthalocyanine nucleus) are independently $SR^1$, $OR^2$, or a fluorine atom and at least one of them are $SR^1$ or $OR^2$. In this invention, the adoption of at least one $SR^1$ or $OR^2$ as one of the substituents for attachment respectively at eight β positions in a phthalocyanine nucleus (and fluorine atoms exclusively as all the remaining substituents) results in the manifestation of an excellent effect in elongating the absorption wavelength, controlling the position of substitution during the subsequent substitution by an amino compound, and exalting the compatibility with resin. The adoption of not less than four $SR^1$'s or $OR^2$'s as the substituents for attachment at the β positions in a phthalocyanine nucleus proves preferable and the adoption of $SR^1$'s or $OR^2$'s as all the eight substituents for attachment at the β positions in a phthalocyanine nucleus proves particularly preferable. The previous adoption of $SR^1$'s or $OR^2$'s as the eight substituents is at an advantage in permitting further control of the position of substitution at the subsequent substitution by an amino compound and consequently allowing further control of the absorption wavelength, because of excellent substitutionality of fluorine. Further, the substitution with $OR^2$ is preferable than the substitution with $SR^1$, because of increase of heat resistance. Incidentally, the adoption of fluorine atoms as the substituents other than those of $SR^1$'s or $OR^2$'s at β position is intended to impart improved resistance to light and resistance to heat in addition to bringing an excellent effect in improving the compatibility with resin as compared with the adoption of hydrogen atoms and other halogen atoms.

Similarly in the general formula (1), $Z_1$, $Z_4$, $Z_5$, $Z_8$, $Z_9$, $Z_{12}$, $Z_{13}$, and $Z_{16}$ (which may be occasionally referred to, in this specification, as substituents for attachment respectively at eight α positions in a phthalocyanine nucleus) are independently $NHR^3$, $SR^1$, $OR^2$, or a fluorine atom and at least one of them is $NHR^3$. In this invention, the adoption of at least one $NHR^3$ as one of the substituents for attachment respectively at eight α positions in a phthalocyanine nucleus (and the limitation of the remaining substituents to $SR^1$, $OR^2$, or fluorine atom) results in the manifestation of an effect in elongating the absorption wavelength and exalting the compatibility with resin. The adoption of 3 to 8 $NHR^3$'s as the substituents for attachment to the relevant α positions in a phthalocyanine nucleus proves more preferable because it brings a conspicuous effect in elongating the absorption wavelength and exalting the compatibility with resin.

Further, if all of the eight β positions of the phthalocyanine nucleus are substituted by $SR^1$ or $OR^2$ and the α positions are substituted by $NHR^3$, the absorption wavelength becomes longer, and the absorption wave shape becomes sharp, visible ray transmittance increases and is preferable. Furthermore, if all of the β positions are substituted by $OR^2$ and all of the α positions are substituted by $NHR^3$, it is preferable because, heat resistance increases.

In the aforementioned general formula (1), at least one of the symbols, $Z_1$ to $Z_{16}$, mentioned above is a fluorine atom. The adoption of 3 to 7 $NHR^3$'s as the substituents for attachment respectively to the eight α positions in a phthalocyanine nucleus and the adoption of fluorine atoms exclusively as the remaining 5 to 1 substituents proves preferable. The reason for this preferability is that the adoption of fluorine atoms as the substituents in the manner just mentioned results in improving the light resistance and the heat resistance besides bringing an excellent effect improving the compatibility with hydrogen atoms and with other resin.

The reason for the preferability of the adoption of $SR^1$, $OR^2$, or a fluorine atom as the substituent other than $NHR^3$ and for the further preferability of the adoption of fluorine atoms exclusively as the remaining substituents is that these substituents manifest an action and effect of permitting control (elongation) of the absorption wavelength, allow the phthalocyanine compound to be synthesized easily and manufactured inexpensively, bring an excellent effect in exalting the compatibility with resin as compared with hydrogen atoms and other halogen atoms, and improve the light resistance and the heat resistance as well.

The adoption of $SR^1$'s or $OR^2$'s (phenylthio groups or phenoxy groups, for example) as four or eight of all the substituents for attachment at the eight β positions in a phthalocyanine nucleus, preferably exclusively as all the eight substituents, and the adoption of 3 to 7 amino compounds represented by $NHR^3$ and 5 to 1 fluorine atom exclusively as the substituents for attachment at the eight α positions in the phthalocyanine nucleus are preferable over any of the varying combinations of substituents, $Z_1$ to $Z_{16}$, mentioned above.

As typical examples of the phthalocyanine compounds of the aforementioned general formula (1) using a nonmetal for M (providing that the phthalocyanine compounds contemplated by this invention are not limited thereto and that the phthalocyanine compounds cited hereinbelow naturally embrace those having a suitable metal, metal oxide, or metal halide for M instead of the nonmetal), the following first group and second group of phthalocyanine compounds may be cited. Incidentally, in the following compounds, the 3 and 6 positions are cites of substitution at the α positions in a phthalocyanine nucleus (cites of substitution of $Z_1$, $Z_4$, $Z_5$, $Z_8$, $Z_9$, $Z_{12}$, $Z_{13}$, and $Z_{16}$) and the 4 and 5 positions are cited of substitution at the β positions of the phthalocyanine nucleus (cited of substitution of $Z_2$, $Z_3$, $Z_6$, $Z_7$, $Z_{10}$, $Z_{11}$, $Z_{14}$, and $Z_{15}$). In the following abbreviations of compounds, Pc is a phthalocyanine nucleus, which is followed first by eight substituents for attachment at the β positions and then by eight substituents for attachment at the α positions.

First group: Phthalocyanines substituted by ($SR^1$) and ($NHR^3$)

4,5-Octakis(phenylthio)-3,6-(pentakisanilinotrifluoro) phthalocyanine,
Abbreviation; $Pc(PHs)_8(PhNH)_5F_3$ 4,5-Octakis(phenylthio)-3,6-(tetrakisanilinotetrafluoro) phthalocyanine,
Abbreviation; $Pc(PhS)_8(PhNH)_4F_4$ 4,5-Octakis(phenylthio)-3,6-(trianilino-pentafluoro) phthalocyanine,
Abbreviation; $Pc(PhS)_8(PhNH)_3F_5$ 4,5-Octakis(phenylthio)3,6-(pentakisanicidinotrifluoro) phthalocyaine,
Abbreviation; $Pc(PhS)_8(p\text{-}CH_3OPhNH)_5F_3$ 4,5-Octakis(phenylthio)-3,6-(trisanicidinopentafluoro) phthalocyanine,
Abbreviation; $Pc(PhS)_8(p\text{-}CH_3OPhNH)_3F_5$ 4,5-Octakis(phenylthio)-3,6-(heptakisbenzylamino-monofluoro) phthalocyanine,
Abbreviation; $Pc(PhS)_8(pHCH_2NH)_7F$ 4,5-Octakis(phenylthio)-3,6-(hexakisbenzylamino-difluoro) phthalocyanine,
Abbreviation; $Pc(PHS)_8(PhCH_2NH)_6F_2$ 4,5-Octakis(phenylthio)-3,6-(pentakisbenzylamino-trifluoro) phthalocyanine,
Abbreviation; $Pc(PhS)_8(PhCH_2NH)_5F_3$ 4,5-Octakis(phenylthio)-3,6-(tetrakisbenzylamino-tetrafluoro) phthalocyanine,
Abbreviation; $Pc(PhS)_8(PhCH_2NH)_4F_4$ 4,5-Octakis(phenylthio)-3,6-(heptakisbutylamino-monofluoro) phthalocyanine,
Abbreviation; Pc(PhS)$_8$(BuNH)$_7$F 4,5-octakis(phenylthio)-3,6-(pentakisbutylamino-trifluoro) phthalocyanine,
Abbreviation; Pc(PhS)$_8$(BuNH)$_5$F$_3$ 4,5-Octakis(phenylthio)-3,6-(hexakisethoxy-ethanolamino-difluoro)phthalocyanine,
Abbreviation; Pc(PhS)$_8$(OHEtOEtNH )$_6$F$_2$ 4,5-Octakis(phenylthio)-3,6-(pentakisbutyl-carbonylphenylaminotrifluoro) phthalocyanine,
Abbreviation; Pc(PhS)$_8$(p-BuOOCPhNH)$_5$F$_3$ 4,5-Octakis(p-toluenethio)-3,6-(pentakisanilino-trifluoro) phthalocyanine,
Abbreviation; Pc(p-CH$_3$Phs)$_5$F$_3$ 4,5-Octakis(p-toluenethio)-3,6-(heptakisbenzylamino-monofluoro) phthalocyanine,
Abbreviation; Pc(p-CH$_3$PhS)$_8$(PhCH$_2$NH)$_7$F 4,5-Octakis(p-toluenethio)-3,6-(hexakisbenzylamino-difluoro) phthalocyanine,
Abbreviation; Pc(p-CH$_2$PhS)$_8$(PhCH$_2$NH)$_6$F$_2$ 4,5-Octakis(p-toluenethio)-3,6-(pentakisbenzylamino-trifluoro)phthalocyanine;
Abbreviation; Pc(p-CH$_3$PhS)$_8$(PhCH$_2$NH)$_5$F$_3$ 4,5-Octakis(p-toluenethio)-3,6-(tetrakisbenzylamino-tetrafluoro) phthalocyanine,
Abbreviation; Pc(p-CH$_3$PhS)$_8$(PhCH$_2$NH)$_4$F$_4$ 4,5-Octakis(butylthio)-3,6-(pentakisanilino-trifluoro) phthalocyanine,
Abbreviation; Pc(BuS)$_8$(PhNH)$_8$F$_3$ 4,5-Octakis(butylthio)-3,6-dis(butylthio)-3,6-(trisanilino-trifluoro) phthalocyanine,
Abbreviation; Pc(BuS)$_8$(BuS)$_2$(PhNH)$_3$F$_3$ 4,5-(Trisbutylthio-pentafluoro)-3,6-(heptakisbenzylamino-monofluoro) phthalocyanine,
Abbreviation: Pc(BuS)$_3$F$_5$(PhCH$_2$NH)$_7$F 4,5-(Tetrakisbutylthio-tetrafluoro)-3,6-(pentakisbenzyl-amino-trifluoro) phthalocyaine,
Abbreviation; Pc(BuS)$_4$F$_4$(PhCH$_2$NH)$_5$F$_3$ 4,5-(Hexakisbutylthio-difluoro)-3,6-(heptakisbutylamino-monofluoro) phthalocyanine,
Abbreviation; Pc(BuS)$_6$F$_2$(BuNH)$_7$F 4,5-(Heptakisbutylthio-fluoro)-3,6-(pentakisbutylamino-trifluoro) phthalocyanine,
Abbreviation; Pc(BuS )$_7$F (BuNH)$_5$F$_3$ 4,,5-Octakis(phenylthio)-3,6-(heptakisphenylethylamino-fluoro) phthalocyanine,
Abbreviation; Pc(Phs)$_8$(PhCH$_2$CH$_2$NH)$_7$F 4,5-Octakis(phenylthio)-3,6-(pentakisphenylethylamino-trifluoro) phthalocyanine,
Abbreviation; Pc(PhS)$_8$(PhCH$_2$NH)$_5$F$_3$ 4,5-Octakis(phenylthio)-3,6-{peptakis(D,L-1-phenylamino)-fluoro} phthalocyanine,
Abbreviation; Pc(PhS)$_8${Ph(CH$_3$)CHNH}$_7$F 4,5-Octakis(phenylthio)-3,6-{pentakis(D,L-1-phenylethylamino)-trifluoro} phthalocyaine,
Abbreviation; Pc(PhS)$_8${Ph(CH$_3$)CHNH}$_5$F$_3$ 4,5-Octakis(phenylthio)-3,6-(heptakisbenzhydryl-aminofluoro) phthalocyanine,
Abbreviation; Pc(PhS)8{(Ph)$_2$CHNH}$_7$F 4,5-Octakis(phenylthio)-3,6-(pentakisbenzhydryl-aminotrifluoro) phthalocyanine,
Abbreviation; Pc(PhS)$_8${(Ph)$_2$CHNH}$_5$F$_3$ 4,5-Octakis(phenylthio)-3,6-{tetrakis(D,L-1-phenylethylamino)-tetrafluoro) phthalocyaine,
Abbreviation; Pc(PhS)$_8${Ph(CH$_3$)CH}$_4$F$_4$ 4,5-Octakis(phenylthio)-3,6-{tetratakis(1,1,3,3-tetramethyl-butylamino)-tetrafluoro}phthalocyanine,
Abbreviation; Pc(PhS)$_8${(CH$_3$)$_3$CCH$_2$C(CH$_3$)$_2$NH}$_4$F$_4$ Second group; Phthalocyanines substituted by (OR$^2$) and (NHR$^3$)

4,5-Octakis(phenoxy)-3,6-(pentakisanilinotrifluoro) phthalocyanine,
Abbreviation; Pc(PhO)$_8$(PhNH)$_5$F$_3$ 4,5-Octakis(phenoxy)-3,6-(tetrakisanilino-tetrafluoro) phthalocyanine,
Abbreviation; Pc(PhO)$_8$(PhNH)$_4$F$_4$ 4,5-Octakis(phenoxy)-3,6-(trisanilino-pentafluoro) phthalocyanine,
Abbreviation; Pc(PhO)$_8$(PhNH)$_3$F$_5$ 4,5-Octakis(phenoxy)-3,6-(pentakisanicidino-trifluoro) phthalocyanine,
Abbreviation; Pc(PhO)$_8$(p-CH$_3$OPhNH)$_5$F$_3$ 4,5-Octakis(phenoxy)-3,6-(trisanicidino-pentafluoro) phthalocyanine,
Abbreviation; Pc(PhO)$_8$(p-CH$_3$OPhNH)$_3$F$_5$ 4,5-Octakis(phenoxy)-3,6-(heptakisbenzylamino-monofluoro) phthalocyanine,
Abbreviation; Pc(PhO)$_8$(PhCH$_2$NH)$_7$F 4,5-Octakis(phenoxy)-3,6-(hexakisbenzylamino-difluoro) phthalocyanine,
Abbreviation; Pc(PhO)$_8$(PhCH$_2$NH)$_6$F$_2$ 4,5-Octakis(phenoxy)-3,6-(hexakisbenzylamino-difluoro) phthalocyanine,
Abbreviation; Pc(PhO)$_8$(PhCH$_2$NH)$_6$F$_2$ 4,5-Octakis(phenoxy)-3,6-(pentakisbenzylamino-trifluoro) phthalocyanine,
Abbreviation; Pc(PhO)$_8$(PhCH$_2$NH)$_5$F$_3$ 4,5-Octakis(phenoxy)-3,6-(tetrakisbenzylamino-tetrafluoro) phthalocyanine,
Abbreviation; Pc(PhO)$_8$(PhCH$_2$NH)$_4$F$_4$ 4,5-Octakis(phenoxy)-3,6-(heptakisbutylamino-monofluoro) phthalocyanine,
Abbreviation; Pc(PhO)$_8$(BuNH)$_7$F 4,,5-Octakis(phenoxy)-3,6-(pentakisbutylamino-trifluoro) phthalocyanine,
Abbreviation; Pc(PhO)$_8$(BuNH)$_5$F$_3$ 4,5-Octakis(phenoxy)-3,6-(hexakisethoxyethanolamino-difluoro) phthalocyanine,
Abbreviation; Pc(PhO)$_8$(OHEtOEtNH)$_6$-F$_2$ 4,5-Octakis(phenoxy)-3,6-(pentakisbutylcarbonyl-phenylamino-trifluoro) phthalocyanine,
Abbreviation; Pc(PhO)$_8$(p-BuOOCPhNH)$_5$F$_3$ 4,5-Octakis(butoxy)-3,6-(pentakisanilino-trifluoro) phthalocyanine,
Abbreviation; Pc(BuO)$_8$(PhNH)$_5$F$_3$ 4,5-Octakis(butoxy)-3,6-(trisanilino-pentafluoro) phthalocyanine,
Abbreviation; Pc(BuO)$_8$(PhNH)$_3$F$_5$ 4,5-Octakis(butoxy)-3,6-(heptakisbenzylamino-monofluoro) phthalocyanine,
Abbreviation; Pc(BuO)$_8$(PhCH$_2$NH)$_7$F 4,5-Octakis(butoxy)-3,6-(pentakidbenzylamino-trifluoro) phthalocyanine,
Abbreviation; Pc(BuO)$_8$(PhCH$_2$NH),$_5$F$_3$ 4,5-(Trisbutoxy-pentafluoro)-3,6-(heptakisbutylamino-monofluoro) phthalocyanine, Abbreviation; Pc(BuO)$_3$F$_5$(BuNH)$_7$F 4,5-(Tetrakisbutoxy-tetrafluoro)-3,6-(pentakisbutylamino-trifluoro) phthalocyanine,
Abbreviation; Pc(BuO)$_4$F$_4$(BuNH)$_6$F$_3$ 4,5-(Tetrakisbutoxy-tetrafluoro)-3,6-(pentakisbutylamino-trifluoro) phthalocyanine,
Abbreviation; Pc(PhO)$_4$F$_4$(PhCH$_2$NH)$_6$F$_2$ 4,5-Octakis(p-cyanophenoxy)-3,6-(heptakisphenylethylamino-fluoro) phthalocyanine,
Abbreviation; Pc(p-CNPhO)$_8$(PhCH$_2$CH$_2$NH)$_7$F 4,5-Octakis(p-cyanophenoxy)-3,6-(pentakisphenylethylamino-trifluoro) phthalocyanine,
Abbreviation; Pc(p-CNPhO)$_8$(PhCH$_2$CH$_2$NH)$_5$F$_8$ 4,5-Octakis(p-cyanophenoxy)-3,6-{(heptakis(DL-1-phenylethyl-amino)-fluoro} phthalocyanine,
Abbreviation; Pc(p-CNPhO)$_8${Ph(CH$_3$)CHNH}$_7$F 4,5-Octakis(p-cyanophenoxy)-3,6-{(pentakis(DL-1-phenylethylamino)-trifluoro} phthalocyaine,
Abbreviation; Pc(p-CNPhO)$_8${Ph(CH$_3$)CHNH}$_5$F$_3$ 4,5-Octakis(p-cyanophenoxy)-3,6-(heptakisbenzhydryl-aminofluoro) phthalocyanine,
Abbreviation; Pc(p-CNPhO)$_8${(Ph)$_2$CHNH}$_7$F 4,5-Octakis(p-cyanophenoxy)-3,6-(pentakisbenzhydryl-amino-trifluoro) phthalocyanine,
Abbreviation; Pc(p-CNPhO)$_8${(Ph)$_2$CHNH}$_5$F$_3$ 4,5-Octakis(2,5-dichlorophenoxy)-3,6-{(pentakis(DL-1-phenylethyl-amino)-tridifluoro} phthalocyaine,
Abbreviation; Pc(2,5-Cl$_2$PhO)$_8${Ph(CH$_3$)CHNH}$_5$F$_3$ 4,5-Octakis(2,5-dichlorophenoxy)-3,6-{hexakis(DL-1-phenylethyl-amino)-difluoro} phthalocyanine,
Abbreviation; Pc(2,5-Cl$_2$PhO)$_8${Ph(CH$_3$)CHNH}$_6$F$_6$ 4,5-Octakis(2,5-dichlorophenoxy)-3,6-(octakisbenzyl-amino) phthalocyanine,
Abbreviation; Pc(2,5-Cl$_2$Pho)$_8$(PhCH$_2$NH)$_8$ Similarly, a typical example of the phthalocyanine compound of the general formula (1) wherein M is non-metal are compounds cited in the first and the second groups, and the following compound and the like.

4,5-octakis(phenylthio)-3,6-(octakisbenzylamino) phthalocyanine,
Abbreviation; Pc(PhS)$_8$(PhCH$_2$NH)$_8$ Then, the near infrared absorbable dye or phthalocyanine compound according to this invention is formed by the use of the phthalocyanine compound mentioned above, which dye exhibits a transmittance of not less than 65% to the visible ray in a solution prepared to contain the phthalocyanine compound at a concentration such that the minimum value of the transmittance at 750 to 1,100 nm in the range of 5 to 6% in the measurement of a transmission spectrum.

The near infrared absorbable dye or phthalocyanine compound of this invention, therefore, exhibits a high transmittance to the visible ray, excels in the ability to absorb the near infrared ray, and permits a highly efficient cut of the near infrared ray. Since it further exhibits fully satisfactory compatibility with resin and excels in such special qualities as heat resistance, light resistance, and resistance to weather conditions, it can be used advantageously as a heat ray shielding material which will be specifically described herein below and as a plasma display grade filter and is highly useful as a non-contact fixing toner for flush fixing and as a near infrared absorbent for insulating heat accumulating fibers.

The phthalocyanine compound itself or the phthalocyanine compound that can be used in the near infrared absorbable dye of this invention falls in the class of phthalocyanine compounds represented by the general formula (1) or (3) mentioned above and fulfills the requirement that it be capable of exhibiting a transmittance of not less than 65%, preferably not less than 70%, to the visible ray in a solution prepared to contain a given phthalocyanine compound at such a concentration that a minimum value of the transmittance at 750 to 1,100 nm becomes in the range of 5 to 6% in the measurement of a transmission spectrum. The near infrared absorbable dye or the phthalocyanine compound of this invention, in a mode of preferred embodiment, is substituted by SR$^1$ or OR$^2$ at 1 or 8, preferably at all the 8, β positions in a phthalocyanine nucleus. As typical examples of the phthalocyanine compound which answers this description, such phthalocyanine compounds as are represented by the abbreviations, ZnPc(PbS)$_8$(PhNH)$_3$F$_5$, ZnPc(PhS)$_8$(PhNH)$_4$F$_4$, ZnPc(PhS)$_8$(PhNH)$_5$F$_3$, ZnPc(PhS)$_8$(PhCH$_2$NH)$_4$F$_4$, ZnPc(PhS)$_8$(PhCH$_2$NH)$_5$F$_3$, ZnPc(PhS)$_8$(PhCH$_2$NH)$_6$F$_2$, CuPc(PhS)$_8$(PhNH)$_7$F, CuPc(PhS)$_8$(PhNH)$_6$F$_2$, CuPc(PhS)$_8$(PhNH)$_5$F$_3$, VOPc(PhO)$_8$(PhCH$_2$NH)$_5$F$_3$, VOPc(PhO)$_8$(PhCH$_2$NH)$_6$F$_2$, VOPc(PhO)$_8$(PhCH$_2$NH)$_8$, and VOPc(PhS)$_8$(PhCH$_2$NH)$_8$ may be cited. As the solvent to be used in defining the minimum value of the transmittance at 750 to 1,100 nm and the transmittance to the visible ray in the measurement of the transmission spectrum of the near infrared absorbable dye or phthalocyanine compound of this invention, chloroform, toluene, tetrahydrofuran, and acetone can be used. When other solvents are used for the measurement, they acquire the minimum value of transmittance at 750 to 1,100 nm and transmittances to the visible ray which are more or less different from the ranges which are proper for the solvents mentioned above. It goes without saying that these magnitudes are not substantially different from those which are proper for this invention. The near infrared absorbable dye or phthalocyanine compound of this invention adopts for the requirements therefor the minimum value of transmittance at 750 to 1,100 nm and the transmittance to the visible ray determined of a given sample in the state of a solution. The reason for this adoption is that since the absorption spectrum varies with the varying state of a given phthalocyanine compound (the state of crystals or the state of a solution, for example) and, as a result, the average of transmittance at 750 to 1,100 nm and the transmittance to the visible ray are proportionately varied to a certain extent, the state of a solution in which the compound affords such average of transmittance and such transmittance to the visible ray as conform with the respective magnitudes existing when the compound is in the state of actual service is adopted in consideration of the state of use of the near infrared absorbable dye or phthalocyanine compound in a heat ray shielding material, a plasma display grade filter, a non-contact fixing toner, or insulating heat accumulating fibers, i.e. the state of intimacy of the dispersion of the dye in the resin.

The method for the production of the phthalocyanine compound represented by the aforementioned general formula (3) does not need to impose any particular restriction but may be suitably selected from among the methods heretofore available for the production of phthalocyanine compounds. Preferably, however, the compound can be synthesized, as set forth in Item (4) above, by the reaction of a phthalocyanine compound represented by the following general formula (2)

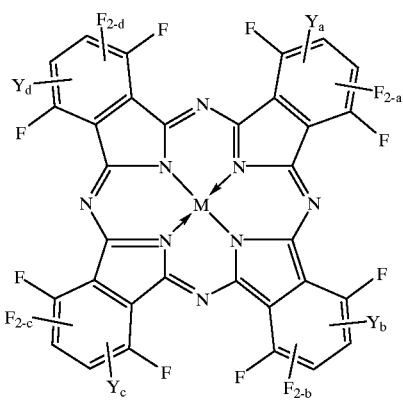

(2)

wherein Y is $SR^1$ or $OR^2$, $R^1$ and $R^2$ are independently a substituted or non-substituted phenyl group, a substituted or non-substituted aralkyl group, or a substituted or non-substituted alkyl group of 1 to 20 carbon atoms, a to d are independently an integer of 0 to 2 and the total of a to d is an integer of 1 to 8, and M is a nonmetal, a metal, a metal oxide, or a metal halide, with an amino compound represented by the formula, $NH_2R^3$, wherein $R^3$ is a substituted or non-substituted phenyl group, a substituted or non-substituted aralkyl group, or a substituted or non-substituted alkyl group of 1 to 20 carbon atoms.

In the general formula (2) representing the phthalocyanine compound, the symbols, $R^1$ and $R^2$ in $SR^1$ and $OR^2$ and M, are identical with the symbols, $R^1$ and $R^2$ in $SR^1$ and $OR^2$ and M, used in the general formula (3) mentioned above. Further, the symbol, $R^3$, in the amino compound $NH_2R^3$ to be used for the method of production mentioned above is identical with the symbol, $R^3$, of the $NHR^3$ appearing in the general formula (3) mentioned above.

The reaction mentioned above, when necessary, can be effected by mixing the relevant reactants in the presence of an inert liquid having no reactivity with the reactants and heating the resultant mixture to a prescribed temperature. Preferably, the reaction is implemented by heating the phthalocyanine compound in the amino compound as a counter reactant to a prescribed temperature. The inert liquids which are usable herein include such nitriles as benzonitrile and acetonitrile, N-methyl pyrrolidone, and such amides as dimethyl formamide, for example.

In the reaction mentioned above, the reaction conditions may be suitably selected in the respectively optimum ranges such that necessary substituents may be introduced as designed to the positions of substitution, $Z_1$ to $Z_{16}$, in the phthalocyanine compound of the aforementioned general formula (3) aimed at. The reaction is generally carried out by charging a reaction vessel with 1 mol of the phthalocyanine compound of the general formula (2) obtained as by the reaction of a phthalonitrile compound with a metal compound and not less than 1 mol of the amino compound $NH_2R^3$, further charging the reaction vessel with 1 to 16 mols, preferably 3 to 8 mols, per mol of the phthalocyanine compound of the general formula (2), of such an inorganic substance as calcium carbonate, calcium fluoride or calcium hydroxide which is intended to trap the hydrogen fluoride arising from the reaction.

The reaction is performed at a reaction temperature in the range of 20° to 200° C., preferably 30° to 150° C., when an alkyl amino compound is used or at a reaction temperature in the range of 80° to 250° C., preferably 100° to 200° C., when an aryl amino compound is used. After the reaction, the phthalocyanine compound of the general formula (3) aimed at can be obtained with high efficiency at a high purity without going through any complicated process when the inorganic substance is separated by filtration and the amino compound is expelled by distillation (washing) in accordance with any of the known methods of synthesis resorting to the reaction of displacement of phthalocyanine compound.

The method for the synthesis of the phthalocyanine compound represented by the aforementioned general formula (2) does not need to impose any particular restriction but may be suitably selected from among the methods heretofore available for the synthesis of phthalocyanine compounds. Preferably, however, the synthesis makes use of the so-called phthalonitrile method which comprises causing phthalonitrile to react with a metal salt in a fused state or as submerged in an organic solvent. The synthesis is preferably effected by the reaction of a phthalonitrile compound represented by the following general formula (4)

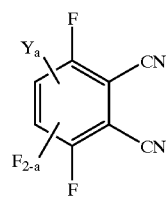

(4)

wherein Y is $SR^1$ or $OR^2$, $R^1$ and $R^2$ are independently a substituted or non-substituted phenyl group, a substituted or non-substituted aralkyl group, or a substituted or non-substituted alkyl group of 1 to 20 carbon atoms, and a is an integer of 1 to 2) or the precursor of a phthalocyanine compound derived from phthalonitrile with a metal, a metal oxide, or a metal halide.

In the general formula (4) representing the phthalonitrile compound, the symbols, $R^1$ and $R^2$, in $SR^1$ and $OR^2$ are identical with the symbols, $R^1$ and $R^2$, in $SR^1$ and $OR^2$ used in the general formula (3). The phthalonitrile compound of the aforementioned general formula (4) which is the starting material as mentioned above can be synthesized by any of the known methods such as, for example, a method which comprises subjecting $HSR^1$ and $HOR^2$ to nucleophilic substitution in the solvent of nitrile such as acetonitrile or benzonitrile by the use of an HF trapping agent such as potassium fluoride, calcium carbonate, etc. It can be produced by the method which is disclosed in JP-A-64-45,474. Otherwise, it can be procured as a commercially available product.

The metal, metal oxide, or metal halide to be used in the method for production mentioned above (hereinafter referred to as "metal compound") imposes no restriction particularly but requires only to be capable of affording in consequence of the reaction what is denoted by the symbol M in the phthalocyanine compound of the general formula (3). As typical examples of the metal compound, metal halide such as chlorides, bromides, or iodides, metal oxides, metal salts of an organic acid such as acetates, complex compounds such as acetylacetonate, metal carbonyl compounds, and metallic powders may be cited.

In the method for the production of the novel phthalocyanine compound of this invention, the reaction of the phthalonitrile compound of the general formula (4) with the metal compound is preferred to be performed by the use of an organic solvent, though it can be carried out in the absence of an organic solvent. The organic solvent may be any of inert solvents which have no reactivity with the starting material. As typical examples of the organic solvent, inert solvents such as benzene, toluene, xylene, nitrobenzene, monochlorobenzene, dichlorobenzene, trichlorobenzene, 1-chloronaphthalene, 1-methyl-naphthalene, ethylene glycol, and benzonitrile and nonprotonic polar solvents such as pyridine, N,N-dimethyl formamide, N-methyl-2-pyrrolidinone, N,N-dimethyl acetophenone, triethyl amine, tri-n-butyl amine, dimethyl sulfoxide, and sulfolan may be cited. Among other solvents mentioned above, 1-chloro-naphthalene, 1-methyl naphthalene, and benzonitrile prove preferable. Benzonitrile proves particularly preferable.

The reaction of the phthalonitrile compound of the general formula (4) with the metal compound mentioned above is effected by charging the reaction vessel with 100 parts by weight (hereinafter referred to briefly as "parts") of the organic solvent and 2 to 40 parts, preferably 20 to 35 parts, of the phthalonitrile compound mentioned above and further charging the reaction vessel with 1 to 2 mols, preferably 1.1 to 1.5 mols, of the metal compound per 4 mols of the phthalonitrile compound and heating the resultant mixture at a temperature in the range of 30° to 250° C., preferably 80° to 200° C. After this reaction, the phthalocyanine compound fit for use at the subsequent step can be obtained with high efficiency at a high purity by subjecting the reaction mixture to filtration, washing, and drying in accordance with the known method for synthesis of a phthalocyanine compound.

Since the method of production according to this invention can produce the target phthalocyanine compound represented by the general formula (3) by causing the phthalocyanine compound of the general formula (2) synthesized from the phthalonitrile compound of the aforementioned general formula (4) to react with the amino compound, it is characterized by permitting accurate introduction of the —$SR^1$ or —$OR^2$ groups to the β positions and the —$NHR^3$ group to the a positions respectively in a phthalocyanine nucleus and allowing necessary control of the positions of the substituents for substitution. Further, the method of production of this invention, as described above, enables the target phthalocyanine compound represented by the general formula (3) to be produced with high efficiency at a high purity without going through any complicated process.

The heat ray shielding material according to this invention is formed of a resin which contains the phthalocyanine compound represented by the aforementioned general formula (1) or (3) (embracing the phthalocyanine compound set forth in claim 6 and the near infrared absorbable dye of this invention set forth in claim 3, as applied similarly hereinafter).

The phthalocyanine compound which can be used in the heat ray shielding material of this invention may be any of the phthalocyanine compounds which are represented at all by the aforementioned general formula (1) or (3). It is, however, preferred to be substituted by $SR^1$ or $OR^2$ at four or eight, preferably at all the eight, β positions in a phthalocyanine nucleus. As typical examples of the phthalocyanine compound which answers this description, such phthalocyanine compounds as are represented by the abbreviations, $ZnPc(PbS)_8(PhNH)_3F_5$, $ZnPc(PhS)_8(PhNH)_4F_4$, $ZnPc(PhS)_8(PhNH)_5F_3$, $ZnPc(PhS)_8(PhCH_2NH)_4F_4$, $ZnPc(PhS)_8(PhCH_2NH)_5F_3$, $ZnPc(PhS)_8(PhCH_2NH)_6F_2$, $CuPc(PhS)_8(PhNH)_7F$, $CuPc(PhS)_8(PhNH)_6F_2$, $CuPc(PhS)_8(PhNH)_5F_3$, $VOPc(PhO)_8(PhCH_2NH)_5F_3$, $VOPc(PhO)_8(PhCH_2NH)_6F_2$, $VOPc(PhO)_8(PhCH_2NH)_8$, and $VOPc(PhS)_8(PhCH_2NH)_8$ may be cited. They attain selective absorption of the light particularly in the near infrared region and enable the heat ray shielding material to acquire an action and effect of efficiently cutting the heat from the sunlight while keeping the transmittance to the visible ray at a relatively high level. The reason for the impartation of the action and effect is that the phthalocyanine compounds mentioned above excel in the ability of selective absorption in the near infrared region, exhibit fine compatibility with resin, and possess such excellent properties as heat resistance, light resistance, and resistance to weather conditions and they allow the heat ray shielding material to manifest an excellent action and effect without a sacrifice of the special properties. The phthalocyanine compound mentioned above can be provided as an inexpensive organic material for the formation of the heat ray shielding material and can be extensively utilized for various applications intended to shield the heat ray. Since the phthalocyanine compound excels in heat resistance, it can manifest numerous outstanding qualities such as allowing its own manufacture to be attained by such a method of forming as injection molding or extrusion molding which abounds in productivity and tolerates use of a standard thermoplastic resin as the raw material.

The resin which can be used in the heat ray shielding material of this invention can be suitably selected, depending on the particular kind of use offered for the produced heat ray shielding material. It is, however, preferred to be a resin which is practically transparent and incapable of inducing heavy absorption or scattering of light. As typical examples of the resin which answers this description, polycarbonate resin; methacrylic resins (such as methyl methacrylate; polystyrene; polyvinyl resins such as polyvinyl chloride and polyvinylidene chloride; polyolefin resins such as polyethylene and polypropylene; polybutyral resin; vinyl acetate type resins such as polyvinyl acetate; polyester resins; and polyamide resins may be cited. These resins may be used singly. Optionally, they may be used in the form of a blend of two or more species so long as the blend is substantially transparent. Such a resin may be used as interposed between two sheets of transparent glass.

Among other species of resin cited above, the polycarbonate resin, (meth)acrylic resin, polyester resin, polystyrene resin, or polyvinyl chloride prove preferable because they excel in weatherability and transparency. The polycarbonate resin, methacrylic resin, polyethylene terephthalate (PET) resin, or polyvinyl chloride prove particularly preferable.

The polycarbonate resin is produced by the reaction of a divalent phenol with the precursor of polycarbonate in accordance with the solution process or the fusion process. As typical examples of the divalent phenol, 2,2-bis(4-hydroxyphenyl) propane [Bisphenol A], 1,1-bis(4-hydroxyphenyl) ethane, 1,1-bis(4-hydroxphenyl) cyclohexane, 2,2-bis(4-hydroxy-3,5-dimethylphenyl) propane, 2,2-bis(4-hydroxy-3,5-dibromophenyl) propane, 2,2-bis(4-hydroxy-3-methylphenyl) propane, bis(4-hydroxyphenyl) sulfide, and bis(4-hydroxyphenyl) sulfone may be cited. Preferable divalent phenols are those of the bis(4-hydroxyphenyl) alkane type. Those divalent phenols which use bisphenol as a main component prove particularly advantageous.

As typical examples of the acrylic resin, methyl methacrylate alone, polymerizing unsaturated monomer mixtures containing not less than 50% of methyl methacrylate, and copolymers of such mixtures may be cited. As typical examples of the polymerizing unsaturated monomer which is copolymerizable with methyl methacrylate, methyl acrylate, ethyl (meth)acrylate (meaning methyl acrylate or methyl methacrylate, as applicable similarly herein below), butyl (meth)acrylate, cyclohexyl (meth)acrylate, 2-ethylhexyl (meth)acrylate, methoxyethyl (meth)acrylate, ethoxyethyl (meth)acrylate, 2-hydroxyethyl (meth)acrylate, N,N-diethylaminoethyl (meth)acrylate, glycidyl (meth) acrylate, tribromophenyl (meth)acrylate, tetrahydroxyfurfuryl (meth)acrylate, ethylene glycol di(meth)acrylate, triethylene glycol di(meth)acrylate, tripropylene glycol di(meth) acrylate, trimethylol ethane di(meth)acrylate, neopentyl glycol di(meth)acrylate, trimethylol propane tri(meth) acrylate, and pentaerythritol tetra (meth) acrylate may be cited.

As the vinyl chloride resin, not only the homopolymer of vinyl chloride but also copolymers using vinyl chloride as a main component may be used. The monomers which can be copolymerized with vinyl chloride include vinylidene chloride, ethylene, propylene, acrylonitrile, vinyl acetate, maleic acid, itaconic acid, acrylic acid, and methacrylic acid, for example.

The heat ray shielding material of this invention is allowed to incorporate therein any of various additives which are used in the production of an ordinary transparent resin material. The additives usable herein include coloring agent, polymerization regulator, antioxidant, ultraviolet absorbent, flame-retardant, plasticizer, rubber intended to improve shock resistance, and peeling agent, for example. The methods which are available for mixing the phthalocyanine compound with a transparent resin and forming the resultant mixture in a prescribed shape include extrusion molding, injection molding, cast polymerization, press molding, calender molding, and cast film forming, for example.

The heat ray shielding material may be manufactured by preparing a film containing the phthalocyanine compound of this invention and hot-pressing or laminating this film with a transparent resin material. Alternatively, the heat ray shielding material can be obtained by applying an acrylic resin ink or a coating material containing the phthalocyanine compound of this invention to a transparent resin material by means of printing or coating.

Since the phthalocyanine compound which is used in the heat ray shielding material of this invention excels in heat resistance as compared with the commercially available infrared absorbent, it can be formed by using an acrylic type resin, polycarbonate type resin, or PET resin and adopting such a molding method as injection molding or extrusion molding which elevates the resin temperature to such a high temperature as 220° to 350° C. The shaped article obtained consequently produces a highly satisfactory sensation of transparency and excels in the ability to cut the heat ray. The phthalocyanine compound may be safely used at a forming temperature of less than 220° C.

The heat ray shielding material imposes no particular restriction on the shape thereof. It is allowed to assume various shapes including a corrugated sheet, a sphere, and a dome besides a flat sheet and a film which command the most popular acceptance. The phthalocyanine compound which is used in the heat ray shielding material of this invention is allowed to vary the ratio thereof to the composition of the material, depending on the magnitudes of transmittance of a target heat ray shielding material set respectively for the visible region and the near infrared region and the thickness of the heat ray shielding material. Generally the phthalocyanine compound is used in this material at a ratio in the range of 0.0005 to 20 parts by weight, preferably 0.0015 to 10 parts by weight, based on 100 parts by weight of a transparent resin.

Further, the optimum range for the aforementioned ratio of the phthalocyanine compound varies with the shape of the heat ray shielding material. This ratio falls preferably in the range of 0.002 to 0.06 part by weight and more preferably in the range of 0.005 to 0.03 part by weight, for example, where heat ray shielding sheet is manufactured in a thickness of 3 mm.

The ratio falls preferably in the range of 0.0005 to 0.02 part by weight and more preferably in the range of 0.0010 to 0.01 part by weight where-the heat ray shielding sheet is manufactured in a thickness of 10 mm. The ratio falls preferably in the range of 0.5 to 20 parts by weight and more preferably in the range of 1.0 to 10 parts by weight where a heat ray shielding film is manufactured in a thickness of 10 μm. To express the amount of the phthalocyanine compound to be contained in the heat ray shielding material without reference to the thickness of this material, the amount in terms of the weight in a area projected from above falls preferably in the range of 0.05 to 2.4 $g/m^2$ and more preferably in the range of 0.10 to 1.0 $g/m^2$.

If the amount of the phthalocyanine compound contained is less than 0.05 $g/m^2$, the produced heat ray shielding material will manifest an insufficient effect in shielding the heat ray. If the amount exceeds 2.4 $g/m^2$, the produced heat ray shielding material will become unduly expensive and will possibly allow only unduly small passage of the visible ray. In the heat ray shielding material in such an irregular shape as a corrugated sheet, the amount under discussion may be regarded as the weight in an area projected from above. The concentration of the phthalocyanine compound in the material may be distributed unevenly so long as this uneven distribution poses no problem from the standpoint of appearance. It is permissible to use two or more species of phthalocyanine compound in the form of a mixture. When a mixture of two or more species of phthalocyanine compound having different absorption wavelengths is used, it possibly bring an improved effect in shielding heat ray.

By using a phthalocyanine compound and such a material as carbon black which is capable of absorbing heat ray together in their respectively specific amounts, the mixture to be formed is allowed to manifest a normal effect in shielding heat ray and decrease to less than half the consumption of the phthalocyanine compound as compared with the product to be formed solely of the phthalocyanine compound.

The plasma display grade filter according to this invention contains 0.0005 to 20 parts by weight of a phthalocyanine compound represented by the general formula (1) or (3) mentioned above (embracing a phthalocyanine compound set forth in claims 1 to 5 and a near infrared absorbable dye of this invention set forth in claim 6, as applicable similarly herein below), based on 100 parts by weight of resin.

The phthalocyanine compound which can be used in the plasma display grade filter of this invention may be any of the phthalocyanine compounds which are represented by the general formula (1) or (3) mentioned above. It is, however, preferred to be a phthalocyanine compound which has $SR^1$'s or $OR^2$'s as four or eight of all the substituents, preferably exclusively as all the eight substituents, for attachment at the eight β positions in a phthalocyanine nucleus. As typical examples of the preferred phthalocyanine compound, such phthalocyanine compounds as are expressed by the abbreviations, $ZnPc(PbS)_8(PhNH)_3F_5$, $ZnPc(PhS)_8(PhNH)_4F_4$, $ZnPc(PhS)_8(PhNH)_5F_3$, $ZnPc(PhS)_8(PhCH_2NH)_4F_4$, $ZnPc(PhS)_8(PhCH_2NH)_5F_3$, $ZnPc(PhS)_8(PhCH_2NH)_6F_2$, CuPc(PhS)$_8$(PhNH)$_7$F, CuPc(PhS)$_8$(PhNH)$_6$F$_2$, CuPc(PhS)$_8$(PhNH)$_5$F$_3$, VOPc(PhO)$_8$(PhCH$_2$NH)$_5$F$_3$, VOPc(PhO)$_8$(PhCH$_2$NH)$_6$F$_2$, VOPc(PhO)$_8$(PhCH$_2$NH)$_8$, and VOPc(PhS)$_8$(PhCH$_2$NH)$_8$, may be cited. They show high transmittances to the visible ray, produce large absorptions of light at 750 to 1,100 nm, abound in solubility, heat resistance, and light resistance, and manifest many high satisfactory special properties.

The plasma display grade filter of this invention is formed by the incorporation of a phthalocyanine compound represented by the general formula (1) or (3) mentioned above in a substrate. The expression "incorporated in a matrix" as used in this invention means a state having the phthalocyanine compound applied to the surface of a substrate and a state having the compound nipped between two opposed substrates as well as a state having the compound contained within the substrate. The substrates which are usable herein include a transparent resin sheet, a transparent film, and a transparent glass, for example. Though the method for manufacturing the plasma display grade filter of this invention by using the aforementioned phthalocyanine compound is not particularly discriminated, the following three methods can be utilized for the manufacture, for example.

(1) A method which comprises kneading the phthalocyanine compound with a resin and thermally forming the resultant mixture thereby manufacturing a resin sheet or film, (2) a method which comprises preparing a coating material (liquid state or pasty state) containing the phthalocyanine compound mentioned above and coating a transparent resin sheet, a transparent film, or a transparent glass sheet with the coating material, and (3) a method which comprises preparing an adhesive agent containing the phthalocyanine compound mentioned above and manufacturing a sandwich resin sheet, a sandwich resin film, a sandwich glass, etc. through the medium of the adhesive agent.

First, in the method of (1) which comprises kneading the phthalocyanine compound with a resin and thermally forming the produced mixture, the resin is preferred to possess such a quality as to impart the highest possible transparency to a resin sheet or a resin film to be produced. As typical examples of the resin which answers this description, polyethylene, polystyrene, polyacryic acid, polyacrylic esters, vinyl compounds such as polyvinyl acetate, polyacrylonitrile, polyvinyl chloride, and polyvinyl fluoride, and addition polymers of such vinyl compounds, polymethacrylic acid, polymethacrylic esters, polyvinylidene chloride, polyvinylidene fluoride, polyvinylidene cyanide, copolymers of vinyl compounds or fluoride type compounds such as vinylidene fluoride/trifluoroethylene copolymer, vinylidene fluoride/tetrafluoroethylene copolymer, and vinylidene cyanide/vinyl acetate copolymer, fluorine-containing resins such as polytrifluoroethylene, polytetrafluoroethylene, and polyhexafluoropropylene, polyamides such as nylon 6 and nylon 66, polyesters such as polyimide, polyurethane, polypeptide, and polyethylene terephthalate, polyethers such as polycarbonate, polyoxymethylene, polyethylene oxide, and polypropylene oxide, epoxy resin, polyvinyl alcohol, and polyvinyl butyral may be cited. The resin does not need to be limited to these examples. Resins possessing high rigidity and high transparency enough to serve as alternate glass, thiourethane type thermosetting resins, and optical grade resins such as ARTON (made by Japan Synthetic Rubber Co., Ltd.), ZEONEX (made by Nippon Zeon Co., Ltd.), OPTPOREZ (made by Hitachi Chemical Co., Ltd.), and O-PET (made by Kanebo Ltd.) may be preferably used.

The method of manufacture has such factors thereof as the processing temperature and the film-forming conditions varied more or less with the kind of the base resin to be used. Generally, (a) a method which comprises adding the phthalocyanine compound of this invention to the base resin in the form of powder or pellets, melting them together by heating to a temperature in the range of 150° to 350° C., and subsequently manufacturing the molten mixture into a resin sheet, (b) a method which comprises manufacturing the mixture into a film by the use of an extruding device, and (c) a method which comprises preparing a green sheet by the use of an extruding device and uniaxially or biaxially stretching the green sheet at a temperature in the range of 30° to 120° C. to two to five times the original size to produce a film, 10 to 200 μm in thickness may be cited as typical examples. The mixture, while being formed, may incorporate therein such additives as an ultraviolet absorbent and a plasticizer which are used in the standard resin forming process. The amount of the phthalocyanine compound of this invention to be added to the resin generally falls in the range of 1 ppm to 20%, though variable with the thickness of a resin sheet to be manufactured, the target intensity of absorption, and the target transmittance to the visible ray. It is also permissible to manufacture a resin sheet or a resin film in accordance with the casting method which comprises bulk polymerizing a mixture of the phthalocyanine compound of this invention as with methyl methacrylate.

The method of (2) which comprises preparing a coating material and applying the coating material to a substrate is known in two types, i.e. a method which comprises solving the phthalocyanine compound of this invention in a binder resin and an organic solvent thereby preparing a coating material and a method which comprises finely pulverizing the phthalocyanine compound into particles, not more than several μm in diameter, and dispersing the resultant powder in an acrylic emulsion thereby manufacturing an aqueous coating material. The former method generally adopts an aliphatic ester type resin, an acrylic resin, a melamine resin, a urethane resin, an aromatic ester type resin, a polycarbonate resin, an aliphatic polyolefin resin, an aromatic polyolefin resin, a polyvinyl resin, a polyvinyl alcohol resin, a polyvinyl type modified resin (PVA, EVA, etc.), or a resin produced by copolymerizing such resins as the binder resin. This method allows adoption of such optical grade resins as ARTON (made by Japan Synthetic Rubber Co., Ltd.), ZEONEX (made by Nippon Zeon Co., Ltd.), OPTPOREZ (made by Hitachi Chemical Co., Ltd.), and O-PET (made by Kanebo Ltd.). As typical examples of the solvent which is used herein, halogen type, alcohol type, ketone type, ester type, aliphatic hydrocarbon type, aromatic hydrocarbon type, and ether type solvents and mixtures thereof may be cited.

The concentration of the phthalocyanine compound of this invention generally falls in the range of 0.1 to 30%, based on the weight of the binder resin, though it is variable with such factors as the thickness of the coating, the target intensity of absorption, and the target transmittance to the visible ray. The concentration of the binder resin generally falls in the range of 1 to 50%, based on the total weight of the coating material. The acryl emulsion type aqueous coating material is obtained by dispersing in an uncolored acryl emulsion coating material the phthalocyanine compound of this invention finely pulverized in advance into particles, 950 to 500 nm in diameter. The coating material may incorporate therein such additives as an ultraviolet absorbent and an antioxidant which are generally used in a standard coating material. The coating material which has been manufactured by the method described above can be applied as to a transparent glass by means of a bar coater, a blade coater, a spin coater, a reverse coater, a die coater, or a spray to manufacture a plasma display grade filter contemplated by this invention. This filter may be provided with a protective layer intended to protect the coating surface thereof or may be superposed on the coating surface thereof by a transparent resin sheet or a transparent resin film. The cast film is embraced by the present method.

In the method of (3) which comprises preparing an adhesive agent containing the phthalocyanine compound and manufacturing a sandwich resin sheet, a sandwich resin film, or a sandwich glass sheet through the medium of the adhesive agent, such known sandwich glass grade transparent adhesive resins as, for example, standard silicone type, urethane type, and acrylic type resin grade or sandwich glass grade polyvinyl butyral adhesive agents (PVA) and ethylene-vinyl acetate type adhesive agents (EVA) can be used as the adhesive agent. By the use of an adhesive agent containing 0.1 to 30% by weight of the phthalocyanine compound of this invention, two opposed transparent resin sheets, a resin sheet and a resin film, a resin sheet and a glass sheet, two opposed resin films, a resin film and a glass sheet, and two opposed glass sheets are joined fast to produce filters. The method of thermo-compression bonding is also available for the purpose of the union in question. The film or the sheet which has been manufactured by the method described above, when necessary, may be pasted to a glass sheet or a resin sheet. The thickness of the filter, though variable with the specifications drawn up for a plasma display to be manufactured, generally falls in the approximate range of 0.1 to 10 mm. Optionally, a transparent film containing an UV absorbent (UV cut film) may be pasted to the outer side of the filter for the purpose of imparting improved light resistance to the filter.

The plasma display grade filter as means for preventing the display from malfunctioning is installed in front of the display for the purpose of cutting the near infrared ray emanating from the display. When this filter shows a low transmittance to the visible ray, therefore, the image on the display has the clarity thereof proportionately lowered. The filter is preferred to have as high a transmittance to the visible ray as permissible. Thus, the transmittance must be at least 60%, preferably not less than 70%. The region of the near infrared ray to be cut falls in the range of 750 to 1,100 nm, a region utilized for remote control or for transmission type optical communication, preferably in the range of 800 to 1000 nm. The filter is designed so that the average transmittance to light in this region may fall below 15%, preferably below 10%. Optionally for the sake of this design, two or more species of the phthalocyanine compound represented by the general formula (1) or (3) mentioned above may be used in combination. Further, the composition of the filter is preferred to incorporate therein other dye possessing an absorption in the visible region for the purpose of varying the color tone of the filter. It is otherwise permissible to manufacture a filter containing a color tone grade dye exclusively and paste this filter to the filter of this invention subsequently. When the filter of this invention is provided with an electromagnetic wave cutting layer as by sputtering, the color tone of this filter is particularly important because the layer possibly causes a large variation in the color shade as compared with the original color of the filter.

The filter obtained by the method described above may be provided with an electromagnetic wave cutting layer adapted to shield the electromagnetic wave emanating from the plasma display, an antireflection (AR) layer, and a nonglare (AG) layer for the purpose of improving the practical performance of the filter. The methods for the manufacture of these layers are not particularly discriminated. The electromagnetic wave cutting layer, for example, can be manufactured by the method of sputtering a metal oxide. The composition produced by adding Sn to $In_2O_2$ (ITO) is generally adopted for this method. The filter, by having dielectric layers and metallic layers alternately superposed thereon, is endowed with an ability to cut the light exceeding 1,100 nm in wavelength and ranging from the near infrared ray the far infrared ray through the electromagnetic wave. The dielectric layer uses such a transparent metal oxide as indium oxide or zinc oxide and the metallic layer generally uses silver or a silver-palladium alloy. Generally, three, five, seven, or 11 such alternate layers are superposed, with a dielectric layer at the start. In this case, though the heat emanating from the display can be cut simultaneously with the light, the phthalocyanine compound of this invention which has an excellent heat ray shielding effect can further improve the heat-shielding effect. As the substrate, the filter containing the phthalocyanine compound of this invention may be utilized without any modification. Otherwise, a resin film or a glass sheet which has been sputtered may be utilized as the substrate, on which the filter containing the phthalocyanine compound may be superposed fast. For the purpose of actually fulfilling the work of cutting the electromagnetic wave, the filter needs to be provided with an electrode for grounding. The antireflection layer, for the sake of repressing the reflection of light on the surface of the filter and allowing the filter to acquire an improved transmittance, is formed by a method which comprises depositing such an inorganic substance as metal oxide, fluoride, boride, carbide, nitride, or sulfide in one layer or a plurality of layers on the filter by the vacuum evaporation technique, sputtering technique, ion plating technique, or ion beam assist technique or a method which comprises depositing resins such as acrylic resin and fluorine resin which have different indexes of refraction in one layer or a plurality of layers. It is alternatively permissible to apply to the filter a film which has undergone a reflection proofing treatment. The filter, when necessary, may be provided with a nonglare (AG) layer. The nonglare (AG) layer, for the sake of scattering the light of transmission in order to enlarge the angle of the field of view, can be formed by a method which comprises liquefying the fine powder of silica,, melamine, or acrylic resin in the form of ink and coating the surface of the filter with the ink. The applied layer of the ink can be rigidified by dint of heat or light. It is otherwise permissible to paste to the filter a film which has undergone a glareproofing treatment. The filter, when necessary, may be further provided with a hard coat layer.

The plasma display grade filter may vary the construction thereof properly to suit the occasion. Generally, the filter containing a near infrared absorbing compound is provided thereon with an antireflection layer and, when necessary, further provided on the side thereof opposite the antireflection layer with a nonglare layer. When the filter is to be combined with an electromagnetic wave cutting layer, this combination can be attained by using a filter containing a near infrared absorbing compound as a substrate and depositing on this substrate an electromagnetic wave cutting layer or by pasting the filter containing the near infrared absorbing compound to a filter having the ability to cut the electromagnetic wave. It is permissible in this case to deposit antireflection layers one each on the opposite sides of the filter or, when necessary, deposit an antireflection layer on one side of the filter and a nonglare layer on the other side thereof. When the filter is to incorporate therein a dye having an absorption in the visible region for the purpose of color correction, this incorporation has no restriction on the method to be adopted therefor. Since the plasma display grade filter of this invention shows a high transmittance to the visible ray, avoids impairing the clarity of the display, and allows an efficient cut of the near infrared light emanating from the display and having a wavelength in the approximate range of 800 to 1000 nm, it exerts no adverse effect on the wavelengths used for remote control of peripheral electronic devices or for transmission type optical communication and prevents such devices from malfunctioning.

Now, this invention will be described more specifically by reference to working examples.

Example of Synthesis 1

Synthesis of $ZnPc(PhS)_8F_8$ (abbreviation)

In a four-neck flask, 100 ml in inner volume, 10 g (26.2 m.mols) of 3,6-difluoro-4,5-bisphenylthiophthalonitrile, 3.14 g (9.8 m.mols) of zinc iodide, and 50 ml of benzonitrile were placed and then kept stirred at a refluxing temperature for about 5 hours. Then the resultant reaction mixture was cooled to obtain a green solid substance. When this solid substance was separated by filtration and then washed with acetone, it produced 7.90 g of $ZnPc(PhS)_8F_8$ (yield 77.2 mol % relative to 3,6-difluoro-4,5-bisphenylthiophthalonitrile).

Example of Synthesis 2

Synthesis of $VOPc(PhS)_8F_8$ (abbreviation)

In a four-neck flask, 100 ml in inner volume, 10 g (26.2 m.mols) of 3,6-difluoro-4,5-bisphenylthiophthalonitrile, 0.6 g (4 m.mols) of divanadium trioxide, 1.01 g (5.3 m.mol) of p-toluene sulfonic acid, and 50 ml of benzonitriie were placed and then kept stirred at a refluxing temperature for about 5 hours. The resultant reaction mixture was cooled to obtain a green solid substance. When this solid substance was separated by filtration and then washed with acetone, it produced 7.86 g of $VOPc(PhS)_8F_8$ (yield 75.7 mol % relative to 3,6-difluoro-4,5-bisphenylthio-phthalonitrile).

Example of Synthesis 3

Synthesis of $CuPc(PhS)_8F_8$ (abbreviation)

In a four-neck flask, 200 ml in inner volume, 10 g (26.2 m.mols) of 3,6-difluoro-4,5-bisphenylthiophthalonitrile, 0.95 g (9.1 m.mols) of cuprous chloride, and 100 ml of N-methyl-2-pyrrolidone were placed and then kept stirred at 140° C. for about 5 hours. The resultant reaction mixture was cooled to obtain a green solid substance. When this solid substance was separated by filtration and washed with acetone, it produced 8.45 g of $CuPc(PhS)_8F_8$ (yield 85.2 mol % relative to 3,6-difluoro-4,5-bisphenylthiophthalonitrile).

Example of Synthesis 4

Synthesis of $VOPc(PhO)_8F_8$ (abbreviation)

In a four-neck flask, 100 ml in inner volume, 9.12 g (26.2 m.mols) of 3,6-difluoro-4,5-bisphenoxyphthalonitrile, 0.19 g (1 m.mol) of p-toluene sulfonic acid, and 50 ml of benzonitrile were placed and then kept stirred at a refluxing temperature for about 5 hours. The resultant reaction mixture was cooled to obtain a green solid substance. When this solid substance was separated by filtration and washed with acetone, it produced 6.95 g of $VOPc(PhO)_8F_8$ (yield 72.7 mol % relative to 3,6-difluoro-4,5-bisphenoxy-phthalonitrile).

Example of Synthesis 5

Synthesis of $VOPc(PhO)_4F_{12}$ (abbreviation)

In a four-neck flask, 100 ml in inner volume, 7.18 g (26.2 m.mols) of 3,5,6-trifluoro-4-phenoxyphthalonitrile, 0.6 g (4 m.mols) of divanadium trioxide, 0.19 g (1 m.mol) of p-toluene sulfonic acid and 50 ml of benzonitrile were placed and then kept stirred at a refluxing temperature for about five hours. The resultant reaction mixture was cooled to obtain a green solid substance. When this solid substance was separated by filtration and washed with acetone, it produces 5.78 g of $VOPc(PhO)_4F_{12}$ (yield 75.7 mol % relative to 2,5,6-trifluoro-4-phenoxyphthalonitrile).

Example of Synthesis 6

Synthesis of $ZnPc(PhS)_8F_8$ (abbreviation)

In a four-neck flask, 100 ml in inner volume, 10 g (25.1 m.mols) of 3,6-difluoro-4,5-bis(p-cyanophenoxy)-phthalonitrile, 0.6 g (4 m.mols) of divanadium Trioxide, 1.14 g (6 m.mol) of p-toluene sulfonic acid, and 50 ml of benzonitrile were placed and then kept stirred at a refluxing temperature for about 8 hours. Then the resultant reaction mixture was cooled and poured into 500 ml of toluene. When a solid substance was separated by filtration and then washed with 200 ml of toluene until the color is disappeared. By drying for one night at 60° C., 9.31 g (yield 89.3 mol % relative to 3,6-difluoro-4,5-bis(p-cyanophenoxy) phthalonitrile) was obtained.

Example of Synthesis 7

Synthesis of $VOPc(2,5-Cl_2PhO)_8F_8$ (abbreviation)

In a four-neck flask, 100 ml in inner volume, 12.73 g (26.2 m.mols) of 3,6-difluoro-4,5-bis(2,5-dichlorophenoxy)-phthalonitrile, 6 g (4 m.mols) of divanadium trioxide, 0.76 g (4 m.mol) of p-toluene sulfonic acid, and 50 ml of benzonitriie were placed and then kept stirred at a refluxing temperature for about 5 hours. The resultant reaction mixture was cooled and poured into 500 ml of toluene. When a solid substance was separated by filtration and then washed with 200 ml of toluene to obtain 115 g of $VOPc(2,5-Cl_2Pho)_8F_8$ (yield 87.6 mol % relative to 3,6-difluoro-4,5-bis(2,5-dichlorophenoxy) phthalonitrile).

Example of Synthesis 8

Synthesis of $ZnPc(2,5-Cl_2PhO)_8F_8$ (abbreviation)

In a four-neck flask, 100 ml in inner volume, 12.73 g (26.2 m.mols) of 3,6-difluoro-4,5-bis( 2,5-dichlorophenoxy-phthalonitrile, 0.64 g (7.9 m.mol) of zinc oxide, 0.095 g (0.5 m.mol) of p-toluene sulfonic acid, and 50 ml of benzonitrile were placed and then kept stirred at a refluxing temperature for about 5 hours. The resultant reaction mixture was cooled and poured into 500 mol of isopropanol. When a solid substance was separated by filtration and washed with 200 ml of isopropanol, 11.36 g of $ZnPc(2,5-Cl_2PhO)_8F_8$ (yield 86.3 mol % relative to 3,6-difluoro-4,5-bis(2,5-dichlorophenoxy)phthalonitrile) was obtained.

Example 1

Synthesis of $ZnPc(PhS)_8(PhNH)_4F_4$ (abbreviation)

In a four-neck flask, 100 ml in inner volume, 2 g (1.26 m.mols) of $F_8(PhS)_8ZnPc$ obtained in Example of Synthesis 1, 1.0 g (10 m.mols) of calcium carbonate, and 60 ml of aniline were placed and then kept stirred at 150° C. for about 8 hours. When the resultant reaction mixture was filtered to remove an inorganic substance and then distilled to expel aniline, it produced 2.07 g of $ZnPc(PhS)_8(PhNH)_4F_4$ (yield 87.6 mol %).

| Elemental analysis | C (%) | H (%) | N (%) | S (%) | F (%) |
|---|---|---|---|---|---|
| Calculated | 66.46 | 3.43 | 8.94 | 13.65 | 4.04 |
| Found | 66.42 | 3.39 | 8.99 | 13.61 | 4.09 |

By the use of a spectrophotometer (made by Shimadzu Seisakusho Ltd. and sold under the product code "UV-3100"), the phthalocyanine compound $\{ZnPc(PhS)_8(PhNH)_4F_4\}$ obtained in the present example was tested in ethyl cellosolve for maximum absorption wavelength and extinction coefficient.

In a quartz cell, 1 cm in gap, a sample of the phthalocyanine compound was placed and diluted with chloroform till the minimum value of the transmittance thereof to light at 750 to 1,100 nm reached a level of 5 to 6% and the diluted sample was tested for transmittance with a spectrophotometer. The transmittance to the visible light was calculated in accordance with the specification of JIS (Japanese Industrial Standard) R3106, with necessary modifications.

By causing the phthalocyanine compound to be dissolved in a gradually increased amount in two separate solvents, toluene and methylethyl ketone (MEK) (both 10 ml in volume), at room temperature (25° C.) while keeping under visual observation the changing states of consequently formed solutions, the maximum amounts of the compound ultimately dissolved in the solvents, namely the final concentrations (degrees of solubility) of the phthalocyanine compound as a solute in the saturated solutions, were found.

The results of these measurements are shown in Table 1 below. The data of solubility shown in Table 1 represent the results of the rating which was conducted on the four-point scale, wherein ⊚ stands for a solubility of not less than 5% by weight, ○ for a solubility of not less than 1% by weight and less than 5% by weight, Δ for a solubility of not less than 0.1% by weight and less than 1% by weight, and X for a solubility of less than 0.1% by weight.

Example 2

Synthesis of $ZnPc(PhS),B(PhCH_2NH)_5F_3$ (abbreviation)

A reaction performed by following the procedure of Example 1 while using 60 ml of benzyl amine in the place of aniline and changing the reaction temperature to 50° C. and the reaction time to 3 hours produced 2.38 g of $ZnPc(PhS)_8(PhCH_2NH)_5F_3$ (yield 93.4 mol %).

| Elemental analysis | C (%) | H (%) | N (%) | S (%) | F (%) |
|---|---|---|---|---|---|
| Calculated | 68.28 | 3.99 | 9.00 | 12.68 | 2.82 |
| Found | 68.20 | 3.92 | 9.06 | 12.61 | 2.86 |

The compound was tested for maximum absorption wavelength, extinction coefficient, transmittance to visual ray, and solubility in the same manner as in Example 1. The results of these measurements are shown in Table 1 below.

Example 3

Synthesis of $ZnPc(PhS)_8(BuNH)_5F_3$ (abbreviation)

A reaction performed by following the procedure of Example 1 while using 60 ml of n-butyl amine in the place of aniline and changing the reaction temperature to 50° C. and the reaction time to 3 hours produced 1.90 g of $ZnPc(PhS)_8(BuNH)_5F_3$ (yield 81.5 mol %).

| Elemental analysis | C (%) | H (%) | N (%) | S (%) | F (%) |
|---|---|---|---|---|---|
| Calculated | 64.8 | 4.90 | 9.83 | 13.85 | 3.08 |
| Found | 64.1 | 4.86 | 9.88 | 13.79 | 3.11 |

The compound was tested for maximum absorption wavelength, extinction coefficient, transmittance to visual ray, and solubility in the same manner as in Example 1. The results of these measurements are shown in Table 1 below.

Example 4

Synthesis of $ZnPc(PhS)_8(HOEtOEtNH)_6F_2$ (abbreviation)

A reaction performed by following the procedure of Example 1 while using 60 ml of 2-(2-aminoethoxy) ethanol in the place of aniline and changing the reaction temperature to 50° C. and the reaction time to 3 hours produced 2.46 g of $ZnPc(PhS)_8(HOEt-OEtNH)_6F_2$ (yield 93.0 mol %).

| Elemental analysis | C (%) | H (%) | N (%) | S (%) | F (%) |
|---|---|---|---|---|---|
| Calculated | 59.54 | 4.80 | 9.35 | 12.23 | 1.81 |
| Found | 59.49 | 4.78 | 9.38 | 12.18 | 1.87 |

The compound was tested for maximum absorption wavelength, extinction coefficient, transmittance to visual ray, and solubility in the same manner as in Example 1. The results of these measurements are shown in Table 1 below.

Example 5

Synthesis of $ZnPc(PhS)_8\{(Ph)_2CHNH\}_4F_4$ (abbreviation)

A reaction performed by following the procedure of Example 1 while using 15 ml of aminodiphenyl methane in the place of aniline and changing the reaction temperature to 50° C. and the reaction time to 3 hours produced 2.62 g of $ZnPc(PhS)_8\{(Ph)_2CHNH\}_4F_4$ (yield 92.8 mol %).

| Elemental analysis | C (%) | H (%) | N (%) | S (%) | F (%) |
|---|---|---|---|---|---|
| Calculated | 70.77 | 3.96 | 7.50 | 11.45 | 3.39 |
| Found | 70.72 | 3.95 | 7.51 | 11.49 | 3.41 |

The compound was tested for maximum absorption wavelength, extinction coefficient, transmittance to visual ray, and solubility in the same manner as in Example 1. The results of these measurements are shown in Table 1 below.

Example 6

Synthesis of $VOPc(PhS)_8(PhCH_2NH)_6F_2$ (abbreviation)

In a four-neck flask, 100 ml in inner volume, 2 g (1.26 m.mols) of $F_8(pHS)_8VOPc$ obtained in Example of Synthesis 2, 1.0 g (10 m.mols) of calcium carbonate, and 60 ml of benzyl amine were placed and then kept stirred at 60° C. for about 3 hours. When the resultant reaction mixture was filtered to separate an inorganic substance and distilled to expel benzyl amine, it produced 2.17 g of $VOPc(PhS)_8(PhCH_2NH)_6F_2$ (yield 81.6 mol %).

| Elemental analysis | C (%) | H (%) | N (%) | S (%) | F (%) |
|---|---|---|---|---|---|
| Calculated | 69.39 | 4.20 | 9.29 | 12.15 | 1.80 |
| Found | 69.43 | 4.19 | 9.33 | 12.10 | 1.85 |

The compound was tested for maximum absorption wavelength, extinction coefficient, transmittance to visual ray, and solubility in the same manner as in Example 1. The results of these measurements are shown in Table 1 below.

Example 7

Synthesis of $VOPc(PhS)_8(n\text{-}BuNH)_7F$ (abbreviation)

A reaction performed by following the procedure of Example 6 while using 60 ml of n-butyl amine in the place of benzyl amine produced 1.86 g of $VOPc(PhS)_8(n\text{-}BuNH)_7F$ (yield 75.2 mol %).

| Elemental analysis | C (%) | H (%) | N (%) | S (%) | F (%) |
|---|---|---|---|---|---|
| Calculated | 66.16 | 5.65 | 10.72 | 13.08 | 0.97 |
| Found | 66.12 | 5.61 | 10.74 | 13.02 | 0.99 |

The compound was tested for maximum absorption wavelength, extinction coefficient, transmittance to visual ray, and solubility in the same manner as in Example 1. The results of these measurements are shown in Table 1 below.

Example 8

Synthesis of $CuPc(PhS)_8(PhCH_2NH)_6F_2$ (abbreviation)

A reaction performed by following the procedure of Example 2 while using 2 g (1.26 m.mols) of $CuPc(PhS)_8F_8$ obtained in Example of Synthesis 3 in the place of $ZnPc(PhS)_8F_8$ produced 2.04 g of $CuPc(PhS)_8(PhCH_2NH)_6F_2$ (yield 76.8 mol %).

| Elemental analysis | C (%) | H (%) | N (%) | S (%) | F (%) |
|---|---|---|---|---|---|
| Calculated | 69.51 | 4.21 | 9.30 | 12.17 | 1.80 |
| Found | 69.48 | 4.18 | 9.35 | 12.11 | 1.83 |

The compound was tested for maximum absorption wavelength, extinction coefficient, transmittance to visual ray, and solubility in the same manner as in Example 1. The results of these measurements are shown in Table 1 below.

Example 9

Synthesis of $VOPc(PhO)_8(PhCH_2NH)_6F_2$ (abbreviation)

A reaction performed by following the procedure of Example 2 while using 2 g (1.37 m.mols) of $VOPc(PhO)_8F_8$ obtained in Example of Synthesis 4 in the place of $ZnPc(PhS)_8F_8$ produced 2.05 g of $VOPc(PhO)_8(PhCH_2NH)_6F_2$ (yield 75.5 mol %).

| Elemental analysis | C (%) | H (%) | N (%) | F (%) |
|---|---|---|---|---|
| Calculated | 73.89 | 4.47 | 9.89 | 1.92 |
| Found | 73.80 | 4.42 | 9.92 | 1.99 |

The compound was tested for maximum absorption wavelength, extinction coefficient, transmittance to visual ray, and solubility in the same manner as in Example 1. The results of these measurements are shown in Table 1 below.

Example 10

Synthesis of $VOPc(PhO)_4F_4(PhCH_2NH)_6F_2$ (abbreviation)

A reaction performed by following the procedure of Example 2 while using 2 g (1.72 m.mols) of $VOPc(PhO)_4F_{12}$ obtained in Example of Synthesis 5 in the place of $ZnPc(PhS)_8F_8$ and further using 60 ml of benzyl amine in the place of aniline produced 1.89 g of $VOPc(PhO)_4F_4(PhCH_2NH)_6F_2$ (yield 65.2 mol %).

| Elemental analysis | C (%) | H (%) | N (%) | F (%) |
|---|---|---|---|---|
| Calculated | 69.79 | 4.06 | 11.63 | 6.76 |
| Found | 69.72 | 4.02 | 11.68 | 6.77 |

The compound was tested for maximum absorption wavelength, extinction coefficient, transmittance to visual ray, and solubility in the same manner as in Example 1. The results of these measurements are shown in Table 1 below.

Example 11

Synthesis of $VOPc(PhS)_8\{Ph(CH_3)CHNH\}_7F$ (abbreviation)

In a four-neck flask, 50 ml in inner volume, 5 g (3.15 m.mols) of $VOPc(PhS)_8F_8$ obtained in Example of Synthesis 2, and 25 ml of DL-1-phenylethylamine were placed and then kept stirred at 120° C. for about 10 hours. Filtrate obtained after filtration was dropped into 250 ml of isopropanol under stirring. The solid substance preciptated was filtered and dried in vacuo for one night to obtain 6.81 g of $VOPc(PhS)_8\{Ph(CH_3)CHNH\}_7F$ (yield 94.2 mol % relative to $VOPc(PhS)_8F_8$).

| Elemental analysis | C (%) | H (%) | N (%) | S (%) | F (%) |
|---|---|---|---|---|---|
| Calculated | 71.12 | 4.83 | 9.15 | 11.17 | 0.83 |
| Found | 71.18 | 4.85 | 9.13 | 11.13 | 0.85 |

The compound was tested for maximum absorption wavelength, extinction coefficient, transmittance to visual ray, and solubility in the same manner as in Example 1. The results of these measurements are shown in Table 1 below.

Example 12

Synthesis of $CuPc(PhS)_8(PhCH_2CH_2NH)_7F$ (abbreviation)

A reaction performed by following the procedure of Example 11 while using $CuPc(PhS)_8F_6$ obtained in Example of Synthesis 3 in place of $VOPc(PhS)_8(PhCH_2CH_2NH)_8F_8$ and 25 ml of phenylethylamine in the place of DL-1- phenylethylamine and changing the reaction temperature to 125° C. and the reaction time to 12 hours produced 59.5 g of $CuPc(PhS)_8(PhCH_2CH_2NH)_7F$ (yield 82.3 mol % relative to $CuPc(PhS)_8F_8$).

| Elemental analysis | C (%) | H (%) | N (%) | S (%) | F (%) |
| --- | --- | --- | --- | --- | --- |
| Calculated | 71.22 | 4.83 | 9.16 | 11.18 | 0.83 |
| Found | 71.26 | 4.85 | 9.12 | 11.14 | 0.86 |

The compound was tested for maximum absorption wavelength, extinction coefficient, transmittance to visual ray, and solubility in the same manner as in Example 1. The results of these measurements are shown in Table 1 below.

Example 13

Synthesis of $VOPc(p-CNPhO)_8(PhCH_2NH)_7F$ (abbreviation)

In a four-neck flask, 50 ml in inner volume, 5 g (3.01 m.mol) of $VOPc(p-CNPhO)_8F_8$ obtained in Example of Synthesis 6, 5.16 g (48.2 m.mols) of benxylamine, 1.5 g (15 m.mol) of calcium carbonate and 28.2 g of benzonitrile were changed and a temperature was maintained at 150° C. for about 8 hours under stirring. Filtrate after filtration was dropped into a mixture of 125 ml of isopropanol and 125 ml of hexane under stirring and a precipitated solid substance was removed by the filtration and dried for one night to obtain $VOPc(p-CNPhO)_8(PhCH_2NH)_7F$ (yield 87.5 mol % relative to $VOPc(p-CNPhO)_8F_8$).

| Elemental analysis | C (%) | H (%) | N (%) | F (%) |
| --- | --- | --- | --- | --- |
| Calculated | 72.48 | 3.91 | 14.19 | 0.84 |
| Found | 72.52 | 3.89 | 14.12 | 0.86 |

The compound was tested for maximum absorption wavelength, extinction coefficient, transmittance to visual ray, and solubility in the same manner as in Example 1. The results of these measurements are shown in Table 1 below.

Example 14

Synthesis of $VOPc(p-CNPhO)_8\{(Ph)_2CHNH\}_7F$ (abbreviation)

A reaction performed by following the procedure of Example 13 while using 60 ml of 2-(2-aminoethoxy) ethanol in 8.83 g (48.2 m.mol) of benzhydrylamine in place of benzylamine and 24.5 g of benzonitrile and changing the reaction temperature to 150° C. and the reaction time to 8 hours produced 8.16 g of $VOPc(p-CNPhO)_8\{(Ph)_2CHNH\}_7F$ (yield 86.3 mol % relative to $VOPc(p-CNPhO)_8F_8$).

| Elemental analysis | C (%) | H (%) | N (%) | F (%) |
| --- | --- | --- | --- | --- |
| Calculated | 79.20 | 3.72 | 10.26 | 0.61 |
| Found | 79.25 | 3.75 | 10.24 | 0.66 |

The compound was tested for maximum absorption wavelength, extinction coefficient, transmittance to visual ray, and solubility in the same manner as in Example 1. The results of these measurements are shown in Table 1 below.

Example 15

Synthesis of $ZnPc(PhS)_8\{Ph(CH_3)CHNH\}_4F_4$ (abbreviation)

In a four-neck flask, 50 ml in inner volume, 2 g (1.26 m.mol) of $ZnPc(PhS)_8F_8$ obtained in Example of Synthesis 1, 1.222 g (10.08 m.mol) of D,L-1-phenylethlamine, 0.555 g (5.54 m.mol) of calcium carbonate and 17 ml of benzonitrile were placed and then kept stirred at 110° C. for about 5 hours. When the resultant reaction mixture was filtered to remove an inorganic substance and then dropped into 280 ml of isopropanol and recrystallized. Solid substance was filtered in suction and dried in vacuo at 60° C. for one night to obtain 2.93 g of $ZnPc(PhS)_8\{Ph(CH_3)CHNH\}_4F_4$ (yield 92.4 mol %).

| Elemental analysis | C (%) | H (%) | N (%) | S (%) | F (%) |
| --- | --- | --- | --- | --- | --- |
| Calculated | 67.54 | 4.05 | 8.44 | 12.88 | 3.82 |
| Found | 67.52 | 4.04 | 8.42 | 12.85 | 3.80 |

The compound was tested for maximum absorption wavelength, extinction coefficient, transmittance to visual ray, and solubility in the same manner as in Example 1. The results of these measurements are shown in Table 1 below.

Example 16

Synthesis of $ZnPc(PhS)_8\{(CH_3)_3CCH_2C(CH_3)_2NH\}_4F_4$ (abbreviation)

A reaction performed by following the procedure of Example 15 while using 60 ml of 2.606 g (20.16 m.mol) of 1,1,3,3-tetramethylbutylamine in the place of D,L-1-phenylethylamine and and the reaction time to 5 hours produced 2.11 g of $ZnPc(PhS)_8\{(CH_3)_3CCH_2C(CH_3)_2NH)\}_4F_4$ (yield 82.5 mol %).

| Elemental analysis | C (%) | H (%) | N (%) | S (%) | F (%) |
| --- | --- | --- | --- | --- | --- |
| Calculated | 66.46 | 5.58 | 8.30 | 12.67 | 3.75 |
| Found | 66.46 | 5.60 | 8.31 | 12.65 | 3.74 |

The compound was tested for maximum absorption wavelength, extinction coefficient, transmittance to visual ray, and solubility in the same manner as in Example 1. The results of these measurements are shown in Table 1 below.

Example 17

Synthesis of $VOPc(2,5-Cl_2PhO)\{Ph(CH_3)CHNH\}_6F_2$ (abbreviation)

In a four-neck flask, 50 ml in inner volume, 2 g (0.99 m.mols) of $F_8(2,5-Cl_2PhO),VOPc$ obtained in Example of Synthesis 7, 1.928 g (15.84 m.mols) of D,L-1-phenylethylamine and 10 ml of benzonitrile were placed and then kept stirred at 120° C. for about 5 hours. The resultant reaction mixture was filtered to separate an inorganic substance and concentrated to 8 ml, then dropped into 80 ml of isopropanol and recrystallized. A solid substance was filterd in suction and was washed in 50 ml of isopropanol for 1 hour under stirring. The solid substance was filtered and dried in vacuo (at 60° C. for one night to obtain 2.03 g of $VOPc(2,5-Cl_2PhO)_8\{(Ph(CH_3)CHNH)\}_6F_2$ (yield 78.6 mol %).

| Elemental analysis | C (%) | H (%) | N (%) | F (%) |
|---|---|---|---|---|
| Calculated | 58.72 | 3.23 | 7.49 | 1.45 |
| Found | 58.75 | 3.25 | 7.50 | 1.43 |

The compound was tested for maximum absorption wavelength, extinction coefficient, transmittance to visual ray, and solubility in the same manner as in Example 1. The results of these measurements are shown in Table 1 below.

Example 18

Synthesis of $VOPc(2,5-Cl_2PhO)_8(PhCH_2NH)_8$ (abbreviation)

In a four-neck flask, 50 ml in inner volume, 2 g (0.99 m.mols) of $F_8(2,5-Cl_2PhO)_8VOPc$ obtained in Example of Synthesis 7, and 12 ml of benzyl amine were placed and then kept stirred at 65° C. for about 12 hours. The resultant reaction mixture was filtered to separate an inorganic substance, and concentrated to 8 ml, then dropped into 80 ml of isopropanol and recrystallized. A solid substance was filtered in suction and dried in vacuo at 60° C. for one night to obtain 2.06 g of $VOPc(2,5-Cl_2PhO)_8(Ph(CH_2)NH)_8$ (yield 76.6 mol %).

| Elemental analysis | C (%) | H (%) | N (%) | F (%) |
|---|---|---|---|---|
| Calculated | 60.31 | 3.27 | 8.27 | 0.00 |
| Found | 60.29 | 3.30 | 8.30 | 0.00 |

The compound was tested for maximum absorption wavelength, extinction coefficient, transmittance to visual ray, and solubility in the same manner as in Example 1. The results of these measurements are shown in Table 1 below.

Example 19

Synthesis of $VOPc(PhS)_8(PhCH_2NH)_8$ (abbreviation)

A reaction performed by following the procedure of Example 6 except that the reaction temperature is 80° C. to obtain 3.03 g of $VoPc(PhS)_8(PhCH_2NH)_6$ (yield 89.0 mol %).

| Elemental analysis | C (%) | H (%) | N (%) | S (%) | F (%) |
|---|---|---|---|---|---|
| Calculated | 71.46 | 4.59 | 9.80 | 11.22 | 0.00 |
| Found | 71.44 | 4.57 | 9.83 | 11.20 | 0.00 |

The compound was tested for maximum absorption wavelength, extinction coefficient, transmittance to visual ray, and solubility in the same manner as in Example 1.

Example 20

Synthesis of $ZnPc(2,5-Cl_2PhO)_8\{(Ph(CH_3)CHNH)_5F_3$ (abbreviation)

In a four-neck flask, 50 ml in inner volume, 2 g (1.00 m.mol) of $F_8(2,5-Cl_2PhO)_8ZnPc$ obtained in Example of Synthesis 8, and 18 ml of D,L-1-phenylethyamine were placed and then kept stirred at 80° C. for about 2 hours. The resultant reaction mixture was filtered to separate an inorganic substance, and washed in 100 ml of isopropanol under stirring. A solid substance was filtrated in suction and dried in vacuo at 60° C. for one night to obtain 1.80 g of $ZnPc(2,5-Cl_2PhO)_8\{(Ph(CH_3)CHNH)_5F_3$ (yield 72.0 mol %).

| Elemental analysis | C (%) | H (%) | N (%) | F (%) |
|---|---|---|---|---|
| Calculated | 57.29 | 2.96 | 7.24 | 2.27 |
| Found | 57.25 | 2.99 | 7.26 | 2.24 |

The compound was tested for maximum absorption wavelength, extinction coefficient, transmittance to visual ray, and solubility in the same manner as in Example 1. The results of these measurements are shown in Table 1 below.

Control 1

The phthalocyanine compound {abbreviation; VOPc $(BuNH)_8(BuS)_8$} stated in Example 10 of JP-A-06-264,050 which issued to a patent application filed by the present applicant was tested for solubility and transmittance to visible ray in the same manner as in Example 1. The results of the measurement are shown in Table 1 below.

Control 2

The phthalocyanine compound {abbreviation; VOPc $(PhNH)_8F_8$} stated in Example 16 of JP-A-06-264,050 which issued to a patent application filed by the present applicant was tested for solubility and transmittance to visible ray in the same manner as in Example 1. The results of the measurement are shown in Table 1 below.

Control 3

The penta(4-methoxyphenylamino)deca(4-methylphenyl-thio) copper phthalocyanine stated in Example 3 of JP-A-07-70,129 was tested for transmittance to visible ray and tested solubility in the same manner as in Example 1. The results of the measurement are shown in Table 1 below.

Control 4

The following compound

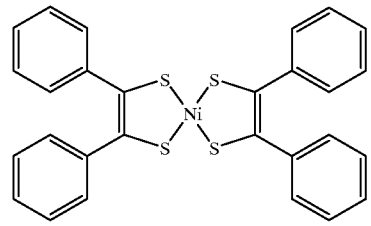

stated in Example 1 of U.S. Pat. No. 5,804,102 was tested for solubility and transmittance to visible ray in the same manner as in Example 1. The results of these measurements are shown in Table 1 below.

TABLE 1

| | Abbreviation, name, or structural formula of phthalocyanine compound | Maximum absorption wavelength (extinction coefficient ε) | Solubility Toluene | Solubility MEK | Transmittance to visible ray (%) |
|---|---|---|---|---|---|
| Example 1 | $ZnPc(PhS)_8(PhNH)_4F_4$ | 845 nm (ε = 99000) | ○ | ○ | 76 |
| Example 2 | $ZnPc(PhS)_8(PhCH_2NH)_5F_3$ | 844 nm (ε = 81000) | ⊚ | ⊚ | 78 |
| Example 3 | $ZnPc(PhS)_8(n\text{-}BuNH)_5F_3$ | 855 nm (ε = 150000) | ○ | ○ | 75 |
| Example 4 | $ZnPc(PhS)_8(HOEtOEtNH)_6F_2$ | 854 nm (ε = 110000) | ○ | ○ | 74 |
| Example 5 | $ZnPc(PhS)_8\{(Ph)_2CHNH\}_4F_4$ | 830 nm (ε = 120000) | ○ | ○ | 74 |
| Example 6 | $VOPc(PhS)_8(PhCH_2NH)_6F_2$ | 1000 nm (ε = 90000) | ○ | ⊚ | 73 |
| Example 7 | $VOPc(PhS)_8(n\text{-}BuNH)_7F$ | 995 nm (ε = 85000) | ⊚ | ○ | 69 |
| Example 8 | $CuPc(PhS)_8(PhCH_2NH)_6F_2$ | 920 nm (ε = 80000) | ⊚ | ⊚ | 74 |
| Example 9 | $VOPc(PhO)_8(PhCH_2NH)_6F_2$ | 958.5 nm (ε = 90000) | ⊚ | ⊚ | 75 |
| Example 10 | $VOPc(PhO)_4F_4(PhCH_2NH)_6F_2$ | 905 nm (ε = 85000) | ○ | ○ | 65 |
| Example 11 | $VOPc(PhS)_8\{Ph(CH_3)CHNH\}_7F$ | 1015 nm (ε = 118000) | ⊚ | ⊚ | 80 |
| Example 12 | $CuPc(PhS)_8(PhCH_2CH_2NH)_7F$ | 930.5 nm (ε = 83000) | ⊚ | ⊚ | 73 |
| Example 13 | $VOPc(p\text{-}CNPhO)_8(PhCH_2NH)_7F$ | 922.0 nm (ε = 72000) | △ | ⊚ | 70 |
| Example 14 | $VOPc(p\text{-}CNPhO)_8\{(Ph)_2CHNH\}_7F$ | 915.0 nm (ε = 74000) | ○ | ⊚ | 75 |
| Example 15 | $ZnPc(PhS)_8\{Ph(CH_3)CHNH\}_4F_4$ | 811.5 nm (ε = 136000) | ⊚ | ⊚ | 80 |
| Example 16 | $ZnPc(PhS)_8\{(CH_3)_3CCH_2C(CH_3)_2NH\}_4F_4$ | 709.5 nm (ε = 134000) | ⊚ | ⊚ | 80 |
| Example 17 | $VOPc(2,5\text{-}\alpha_2PhO)_8\{Ph(CH_3)CHNH\}_6F_2$ | 922.0 nm (ε = 7800) | ⊚ | ⊚ | 73 |
| Example 18 | $VOPc(2,5\text{-}\alpha_2PhO)_8\{PhCH_2NH\}_8$ | 1000.0 nm (ε = 9200) | ⊚ | ⊚ | 80 |
| Example 19 | $VOPc(PhS)_8(PhCH_2NH)_8$ | 1020.0 nm (ε = 9000) | ○ | ⊚ | 73 |
| Example 20 | $ZnPc(2,5\text{-}\alpha_2PhO)_8\{Ph(CH_3)CHNH\}_5F_3$ | 795.5 nm (ε = 9500) | ⊚ | ⊚ | 80 |
| Control 1 | $VOPc(BuNH)_8\{BuS\}_8$ | 895 nm (—) | ⊚ | ⊚ | 59 |
| Control 2 | $VOPc(PhNH)_8F_8$ | 860 nm (—) | ⊚ | ⊚ | 48 |
| Control 3 | Penta(4-methoxyphenylamino)deca(4-methyl-phenylthio) copper phthalocyanine | 849 nm (—) | ⊚ | ○ | 61 |
| Control 4 | 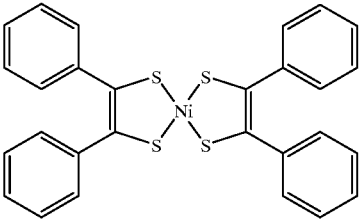 | 856 nm (—) | x | x | 77 |

Example 21

A filter was obtained by adding 0.0053 part by weight of the phthalocyanine compound $\{ZnPc(PhS)_8(PhNH)_4F_4\}$ obtained in Example 1 to 100 parts by weight of a fused polycarbonate resin (made by Teijin Chemicals, Ltd. and sold under the trademark designation of "Panlite 1285") and manufacturing the resultant mixture with a T-die extruding device at 280° C. into a sheet, 2.5 mm in thickness.

The produced filter, on analysis, was found to have a minimum value of the transmittance of 5.6% to a light of 750 to 1,100 nm and a transmittance of 74% to visible ray.

The filter was actually attached to the front side of a plasma display. An electronic device adapted for remote controlling the plasma display was installed at a distance of 2.5 m from the display and operated by way of determining whether or not the operation thereof would induce a malfunction of the display. The operation induced the malfunction in the presence of the filter. It was found to induce absolutely no malfunction when the filter was attached to the display.

Example 22

A filter was obtained by following the procedure of Example 21 while changing the phthalocyanine compound to 0.0084 part by weight of a phthalocyanine compound $\{CuPc(PhS)_8(PhCH_2NH)_6F_2\}$ obtained in Example 21. The filter, on analysis, was found to have a minimum value of the transmittance of 5.4% to a light of 750 to 1,100 nm and a transmittance of 71% to visible ray.

When the filter was tested in the same manner as in Example 21 to determine whether or not it was effective in precluding the plasm display from malfunctioning, it was confirmed that absolutely no malfunction was induced when the filter was attached to the plasma display.

Example 23

A filter film, 0.1 mm in thickness, was obtained by adding 0.133 part by weight of the phthalocyanine compound $\{ZnPc(PhS)_8(PhCH_2NH)_5F_3\}$ obtained in Example 2 to 100 parts by weight of fused polyethylene terephthalate resin and molding the resultant mixture with an extruding device and a film-forming device at 280° C. The filter film, on analysis, was found to have a minimum value of the transmittance of 5.2 to a light of 750 to 1,100 nm and a transmittance of 70% to visible ray.

When the filter film was actually attached to the front side of a plasma display and the plasma display was tested in the same manner as in Example 21 to determine whether or not the operation thereof would induce a malfunction, absolutely no induction of any malfunction was observed when the filter film was attached to the plasma display. Examples 24 and 25:

As illustrated in FIG. 1, a temperature measuring device 6 was constructed by disposing support posts 3 perpendicularly (in the direction of incidence of the direct sunlight) to a support base 2 adjusted to form a substantially right angle relative to the direct sunlight 1, setting a measuring filter 4 at the leading ends of the support posts 3, and disposing a sample supporting plate 5 adjustable in the vertical direction in the proximity to the lower parts of the support posts 3 (such that the device was prevented from accumulating heat by the use of a panel for the measurement which was pervious to a current of air). A black panel 7 was set on the sample supporting plate 5, with a distance of 200 mm interposed between the surface of the black panel 7 and the lower side of the measuring filter 4, and a temperature sensor 8 was placed fast on the surface of the black panel 7. This temperature sensor 8 was connected via a conductor wire 9 to a measuring device (not shown). By the use of this temperature measuring device 6, the parts exposed to the beams of direct sunlight passing through the filters of Example 21 and Example 22 were measured for temperature. The filters were subjected to 100 hours' light resistance test under the conditions of 50% of humidity, 63° C. of black panel temperature, and 90 mW/cm$^2$ of intensity of ultraviolet light. The results are shown in Table 2 below.

Control 5

A polycarbonate sheet, 2.5 mm in thickness, was obtained by molding a fused polycarbonate resin (made by Teijin Chemicals, Ltd. and sold under the trademark designation of "Panlite 1285") with a T-die extruding device at 280° C. The produced sheet was tested for temperature behavior and light resistance in the same manner as in Example 24 and Example 25. The results are shown in Table 2 below.

Controls 6 and 7

Filters were obtained by adding phthalocyanine compounds {abbreviations; VOPc (BuNH)$_8$(BuS)$_8$ and VOPc (PhNH)$_8$F$_8$} in the amounts indicated in Table 2 respectively to 100 parts by weight of a fused polycarbonate resin (made by Teijin Chemicals, Ltd. and sold under the trademark designation of "Panlite 1285") and molding the resultant mixtures with a T-die extruding device at 280° C. into sheets, 2.5 mm in thickness. The produced filters were tested for transmittance to visible ray. The results are shown in Table 2 below.

The filters were also tested for temperature behavior and light resistance in the same manner as in Example 24 and Example 25. The results are shown in Table 2 below.

It is noted by comparing the transmittances to visible ray obtained by the filters produced in the working examples with those obtained by the filters produced in Controls 1 to 3 that the samples of the working examples absorbed near infrared ray at 750 to 1,100 nm and heat ray and more conspicuously avoided lowering the transmittances to visible ray than the samples of Controls 1 to 3. That is to say, the samples of the working examples excelled the samples of the controls further in transparency while exhibiting at least the same ability to absorb near infrared ray and heat ray as the samples of Controls 1 to 3.

Further, large differences were observed in solubility between the samples of the working examples and the sample of Control 4. These data demonstrates that the phthalocyanine compounds according to this invention are characterized by exhibiting very high levels of solubility and very high levels of compatibility with resin.

The samples of the working examples, as clearly noted by comparison with the samples of Controls 6 and 7, allow effective absorption and interception of the rays of heat and light without interfering with the passage of visible ray because they amply repress the rise of temperature and exhibit high transmittances to visible ray. In other words, they excel in transparency and in the ability to shield the heat ray.

It is also clear that the filters according to the present invention withstand the influences of practical service fully satisfactorily because they suffer only small changes of color stability after the test for light resistance and excel in resistance to weather conditions.

The entire disclosure of Japanese Patent Application No. 10-22318 filed on Feb. 3, 1998 including specification, claims and summary are incorporated herein by reference in its entirety.

TABLE 2

| | Abbreviation of phthalocyanine compound | Amount added (parts by weight) | Temperature of black panel (° C.) | Transmittance to visible ray (%) | Light resistance (ΔE) |
| --- | --- | --- | --- | --- | --- |
| Example 24 | ZnPc(PhS)$_8$(PhNH)$_4$F$_4$ | 0.0053 | 33.5 | 74 | 0.3 |
| Example 25 | CuPc(PhS)$_8$(PhCH$_2$NH)$_6$F$_2$ | 0.0084 | 32.0 | 71 | 0.3 |
| Control 5 | — | No Addition | 43.5 | 96 | 0.4 |
| Control 6 | VOPc(BuNH)$_8$(BuS)$_8$ | 0.0071 | 38.5 | 65 | 0.3 |
| Control 7 | VOPc(PhNH)$_8$F$_8$ | 0.0074 | 41.5 | 55 | 0.3 |

What is claimed is:

1. A phthalocyanine compound represented by the following general formula (1)

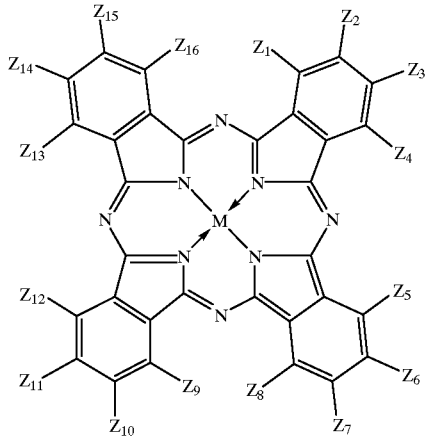

wherein $Z_2$, $Z_3$, $Z_6$, $Z_7$, $Z_{10}$, $Z_{11}$, $Z_{14}$, and $Z_{15}$ are independently $SR^1$; $OR^2$, or a fluorine atom, and at least one of them is $SR^1$ or $OR^2$, $Z_1$, $Z_4$, $Z_5$, $Z_8$, $Z_9$, $Z_{12}$, $Z_{13}$, and $Z_{16}$ independently stand for $NHR^3$; $SR^1$, $OR^2$, or a fluorine atom and at least one of them is $NHR^3$; at least one of $Z_1$ to $Z_{16}$ stands for a fluorine atom or $OR^2$, $R^1$, $R^2$, and $R^3$ are independently a substituted or non-substituted phenyl group; a substituted or non-substituted aralkyl group, or a substituted or non-substituted alkyl group of 1 to 20 carbon atoms, and M is a nonmetal, a metal, a metal oxide, or a metal halide.

2. A phthalocyanine compound according to claim 1, wherein 4 to 8 of $Z_2$, $Z_3$, $Z_6$, $Z_7$, $Z_{10}$, $Z_{11}$, $Z_{14}$, and $Z_{15}$ shown in the general formula (1) mentioned above invariably are $SR^1$ or $OR^2$.

3. A phthalocyanine compound according to claim 1, wherein $R^1$, $R^2$, and $R^3$ are independently an alkyl group of 1 to 8 carbon atoms.

4. A phthalocyanine compound according to claim 1, wherein 3 to 7 $NHR^3$'s are adopted for as many of the substituents attached to the eight a positions of a phthalocyanine nucleus and the balance, 5 to 1, exclusively fluorine atoms are adopted for the rest of the substituents.

5. A phthalocyanine compound according to claim 4, wherein 4 to 8 of the substituents attached at the eight β positions of a phthalocyanine nucleus are invariably $SR^1$ or $OR^2$.

6. A near infrared absorbable dye formed by using a phthalocyanine compound set forth in claim 1, wherein said dye exhibits a transmittance of not less than 65% to the visible ray in a solution prepared to contain said phthalocyanine compound at a concentration such that a minimum value of the transmittance at 750 to 1,100 nm in the range of 5 to 6% in the measurement of a transmission spectrum.

7. A method for the production of a phthalocyanine compound represented by said general formula (3):

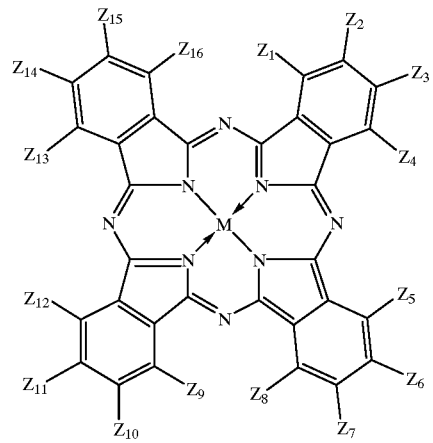

wherein $Z_2$, $Z_3$, $Z_6$, $Z_7$, $Z_{10}$, $Z_{11}$, $Z_{14}$, and $Z_{15}$ are independently $SR^1$, $OR^2$, or a fluorine atom, and at least one of them are $SR^1$ or $OR^2$; $Z_1$, $Z_4$, $Z_5$, $Z_8$, $Z_9$, $Z_{12}$, $Z_{13}$, and $Z_{16}$ are independently $NHR^3$, $SR^1$, $OR^2$, or a fluorine atom and at least one of them is $NHR^3$; $R^1$, $R^2$, and $R^3$ are independently a substituted or non-substituted phenyl group, a substituted or non-substituted aralkyl group, or a substituted or non-substituted alkyl group of 1 to 20 carbon atoms; and M is a nonmetal, a metal, a metal oxide, or a metal halide; which comprises reacting a phthalocyanine compound represented by the following general formula (2)

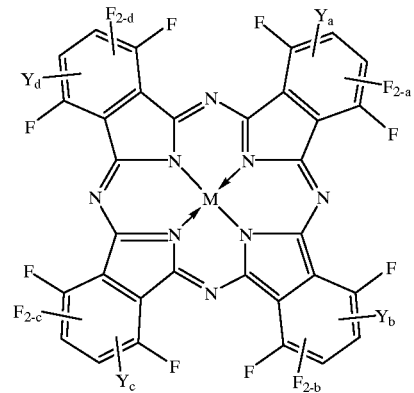

wherein Y is $SR^1$ or $OR^2 R^1$ and $R^2$ are independently a substituted or non-substituted phenyl group, a substituted or non-substituted aralkyl group, or a substituted or non-substituted alkyl group of 1 to 20 carbon atoms; a to d are independently an integer of 0 to 2 and the total of a to d is an integer of 1 to 8; and M is a nonmetal, a metal, a metal oxide, or a metal halide; with an amino compound represented by the formula, $NH_2R^3$ wherein $R^3$ is a substituted or non-substituted phenyl group, a substituted or non-substituted aralkyl group, or a substituted or non-substituted alkyl group of 1 to 20 carbon atoms.

8. A method according to claim 7, wherein said reaction is carried out in an inert organic solvent.

9. A method according to claim 8, wherein 2 to 40 parts by weight of said phthalonitrile compound based on 100 parts by weight of said inert organic solvent is caused to react with 1 to 2 mols of said metal compound per 4 moles of said phthalonitrile compound at a temperature in the range of 30 to 250° C.

10. A heat ray shielding material formed of a resin containing 0.0005 to 20 parts by weight, based on 100 parts by weight of said resin, of a phthalocyanine compound set forth in claim 1 or a near infrared absorbable dye set forth in claim 6 or a phthalocyanine compound represented by the general formula (3) set forth in claim 7.

11. A heat ray shielding material according to claim 10, wherein said resin is a transparent resin.

12. A heat ray shielding material according to claim 10, wherein said transparent resin is at least one member selected from the group consisting of polycarbonate resin, poly(meth)acrylic resin, polyethylene resin, polyester resin, polystyrene resin, and vinyl chloride resin.

13. A plasma display grade filter containing either a phthalocyanine compound set forth in claim 1 or a near infrared absorbable dye set forth in claim 6 or a phthalocyanine compound represented by the general formula (3) set forth in claim 7.

14. A filter according to claim 13, wherein said phthalocyanine compound or said near infrared absorbable dye is contained in an amount in the range of 0.0005 to 20 parts by weight, based on 100 parts by weight of a transparent resin.

15. A filter according to claim 14, wherein said transparent resin is at least one member selected from the group consisting of polycarbonate resin, poly(meth)acrylic resin, polyethylene resin, polyester resin, polystyrene resin, and vinyl chloride resin.

16. A phthalocyanine compound according to claim 1, wherein the nonmetal is two hydrogen atoms.

17. The method according to claim 7, wherein the nonmetal is two hydrogen atoms.

18. A heat ray shielding material according to claim 10, wherein the nonmetal is two hydrogen atoms.

19. A plasma display grade filter according to claim 13, wherein the nonmetal is two hydrogen atoms.

* * * * *